US011575281B2

(12) United States Patent
Laughery et al.

(10) Patent No.: US 11,575,281 B2
(45) Date of Patent: Feb. 7, 2023

(54) SYSTEM AND METHOD FOR WIRELESSLY CHARGING A MEDICAL DEVICE BATTERY

(71) Applicant: Stryker Corporation, Kalamazoo, MI (US)

(72) Inventors: Sean Christopher Laughery, Vicksburg, MI (US); Bryan Christian Mohney, Schoolcraft, MI (US); Burton Connor Judson, Kalamazoo, MI (US); Daniel Scott Gunnett, Portage, MI (US)

(73) Assignee: Stryker Corporation, Kalamazoo, MI (US)

(*) Notice: Subject to any disclaimer, the term of this patent is extended or adjusted under 35 U.S.C. 154(b) by 497 days.

(21) Appl. No.: 16/651,246

(22) PCT Filed: Sep. 26, 2018

(86) PCT No.: PCT/US2018/052854
§ 371 (c)(1),
(2) Date: Mar. 26, 2020

(87) PCT Pub. No.: WO2019/067539
PCT Pub. Date: Apr. 4, 2019

(65) Prior Publication Data
US 2020/0280219 A1 Sep. 3, 2020

Related U.S. Application Data

(60) Provisional application No. 62/563,245, filed on Sep. 26, 2017.

(51) Int. Cl.
*H02J 50/40* (2016.01)
*H02J 7/00* (2006.01)
*H02J 50/10* (2016.01)

(52) U.S. Cl.
CPC ........ *H02J 50/402* (2020.01); *H02J 7/00045* (2020.01); *H02J 7/0045* (2013.01); *H02J 7/0047* (2013.01); *H02J 50/10* (2016.02)

(58) Field of Classification Search
CPC .... H02J 50/402; H02J 7/0045; H02J 7/00457; H02J 7/00045; H02J 50/10
(Continued)

(56) References Cited

U.S. PATENT DOCUMENTS 645,576 A  3/1900  Trower et al.
3,861,873 A  1/1975  MacFarlane et al.
(Continued)

FOREIGN PATENT DOCUMENTS

DE  3734120 A1  4/1989
DE  10109358 C1  11/2002
(Continued)

OTHER PUBLICATIONS

International Search Report for Application No. PCT/US2018/052854 dated Jan. 7, 2019, 4 pages.
(Continued)

*Primary Examiner* — Edward Tso
*Assistant Examiner* — Aaron Piggush
(74) *Attorney, Agent, or Firm* — Howard & Howard Attorneys PLLC

(57) ABSTRACT

A system includes a battery having a battery controller and a container including a plurality of receptacles, each receptacle being shaped to receive the battery. The system also includes a charging device including a plurality of charging bays, wherein each charging bay is shaped to receive a respective receptacle of the plurality of receptacles. Each charging bay includes a first antenna configured to provide charging power to the battery, a second antenna configured to communicate with the battery controller, and a charger
(Continued)

controller. The charger controller is configured to detect a presence of the battery within a receptacle associated with a charging bay, establish communication with the battery using the second antenna while the first antenna is deactivated, pair the battery to the charging device, activate the first antenna after the battery is paired, and provide charging power to the battery using the first antenna.

20 Claims, 16 Drawing Sheets

(58) Field of Classification Search
USPC .............................. 320/107, 108, 112, 113
See application file for complete search history.

(56) References Cited

U.S. PATENT DOCUMENTS

| | | | |
|---|---|---|---|
| 5,183,643 A | 2/1993 | Nichols | |
| 5,225,767 A | 7/1993 | Gulczynski | |
| 5,455,466 A | 10/1995 | Parks et al. | |
| 5,734,254 A | 3/1998 | Stephens | |
| 5,744,933 A | 4/1998 | Inoue et al. | |
| 5,952,814 A | 9/1999 | Van Lerberghe | |
| 6,018,227 A | 1/2000 | Kumar et al. | |
| 6,118,249 A | 9/2000 | Brockmann et al. | |
| 6,184,651 B1 | 2/2001 | Fernandez et al. | |
| 6,184,655 B1 | 2/2001 | Malackowski | |
| 6,301,128 B1 | 10/2001 | Jang et al. | |
| 6,379,631 B1 | 4/2002 | Wu | |
| 6,605,922 B2 | 8/2003 | Tamai et al. | |
| 6,844,702 B2 | 1/2005 | Giannopoulos et al. | |
| 6,847,190 B2 | 1/2005 | Schaefer et al. | |
| 7,501,198 B2 | 3/2009 | Barlev et al. | |
| 7,705,559 B2 | 4/2010 | Powell et al. | |
| 7,948,208 B2 | 5/2011 | Partovi et al. | |
| 8,169,185 B2 | 5/2012 | Partovi et al. | |
| 8,183,827 B2 | 5/2012 | Lyon | |
| 8,258,745 B2 | 9/2012 | Smith et al. | |
| 8,278,873 B2 | 10/2012 | Smith et al. | |
| 8,344,690 B2 | 1/2013 | Smith et al. | |
| 8,344,691 B2 | 1/2013 | Smith et al. | |
| 8,418,872 B2 | 4/2013 | Smith | |
| 8,431,153 B2 | 4/2013 | Shukla | |
| 8,432,293 B2 | 4/2013 | Symons | |
| 8,519,668 B2 | 8/2013 | Hui | |
| 8,567,048 B2 | 10/2013 | Singh et al. | |
| 8,590,724 B2 | 11/2013 | Kreidler et al. | |
| 8,594,567 B2 | 11/2013 | Finkenzeller et al. | |
| 8,629,652 B2 | 1/2014 | Partovi et al. | |
| 8,638,062 B2 | 1/2014 | Baarman et al. | |
| 8,803,475 B2 | 8/2014 | Smith et al. | |
| 8,808,283 B2 | 8/2014 | Moua et al. | |
| 8,810,197 B2 | 8/2014 | Juergens | |
| 8,890,470 B2 | 11/2014 | Partovi | |
| 8,901,779 B2 | 12/2014 | Kesler et al. | |
| 8,947,047 B2 | 2/2015 | Partovi et al. | |
| 9,000,720 B2 | 4/2015 | Stulen et al. | |
| 9,024,576 B2 | 5/2015 | Maenpaa | |
| 9,106,203 B2 | 8/2015 | Kesler et al. | |
| 9,124,121 B2 | 9/2015 | Ben-Shalom et al. | |
| 9,131,034 B2 | 9/2015 | Ma et al. | |
| 9,136,729 B2 | 9/2015 | Ashinghurst et al. | |
| 9,142,989 B2 | 9/2015 | Fell et al. | |
| 9,143,003 B2 | 9/2015 | Baarman et al. | |
| 9,178,369 B2 | 11/2015 | Partovi | |
| 9,178,569 B2 | 11/2015 | Chakravarty et al. | |
| 9,209,634 B2 | 12/2015 | Cottrill et al. | |
| 9,248,205 B2 | 2/2016 | Smith et al. | |
| 9,276,437 B2 | 3/2016 | Partovi et al. | |
| 9,301,718 B2 | 4/2016 | Lin | |
| 9,327,041 B2 | 5/2016 | Hawkes | |
| 9,364,288 B2 | 6/2016 | Smith et al. | |
| 9,381,058 B2 | 7/2016 | Houser et al. | |
| 9,472,966 B2 | 10/2016 | Frushour et al. | |
| 9,554,411 B1 * | 1/2017 | Hall | H02J 50/80 |
| 9,583,803 B2 | 2/2017 | Miller et al. | |
| 9,590,446 B2 | 3/2017 | Park et al. | |
| 9,597,143 B2 | 3/2017 | Madan et al. | |
| 9,601,943 B2 | 3/2017 | Partovi et al. | |
| 9,667,091 B2 | 5/2017 | Baek et al. | |
| 9,680,335 B2 | 6/2017 | Kang et al. | |
| 9,707,395 B2 | 7/2017 | Marnfeldt et al. | |
| 9,711,999 B2 | 7/2017 | Hietala et al. | |
| 9,722,447 B2 | 8/2017 | Partovi | |
| 9,750,930 B2 | 9/2017 | Chen | |
| 9,824,815 B2 | 11/2017 | Leabman et al. | |
| 9,837,862 B2 | 12/2017 | Sherman et al. | |
| 9,842,686 B2 | 12/2017 | Peterson et al. | |
| 9,847,677 B1 | 12/2017 | Leabman et al. | |
| 9,866,051 B2 | 1/2018 | Peterson | |
| 9,872,723 B2 | 1/2018 | Smith | |
| 9,876,380 B1 | 1/2018 | Leabman et al. | |
| 9,929,584 B2 | 3/2018 | Aghassian et al. | |
| 9,941,590 B2 | 4/2018 | Luzinski et al. | |
| 9,948,128 B2 | 4/2018 | Ashinghurst et al. | |
| 10,004,911 B2 | 6/2018 | Marnfeldt et al. | |
| 10,044,229 B2 | 8/2018 | Partovi et al. | |
| 10,056,790 B2 | 8/2018 | Miller et al. | |
| 10,063,105 B2 | 8/2018 | Leabman | |
| 10,115,520 B2 | 10/2018 | Partovi | |
| 10,236,709 B2 | 3/2019 | Decker et al. | |
| 10,250,066 B2 | 4/2019 | Jankins et al. | |
| 10,284,023 B2 | 5/2019 | Kim et al. | |
| 10,312,722 B2 | 6/2019 | Decker et al. | |
| 10,396,606 B2 | 8/2019 | Hall et al. | |
| 10,468,904 B2 | 11/2019 | Decker et al. | |
| 2003/0102842 A1 | 6/2003 | Tamai et al. | |
| 2004/0145342 A1 | 7/2004 | Lyon | |
| 2007/0090025 A1 | 4/2007 | Strand | |
| 2007/0090788 A1 | 4/2007 | Hansford et al. | |
| 2011/0279226 A1 | 11/2011 | Chen et al. | |
| 2012/0116380 A1 | 5/2012 | Madan et al. | |
| 2012/0116381 A1 | 5/2012 | Houser et al. | |
| 2012/0306281 A1 | 12/2012 | Bohori et al. | |
| 2013/0300204 A1 | 11/2013 | Partovi | |
| 2014/0074185 A1 | 3/2014 | Fell et al. | |
| 2014/0132210 A1 | 5/2014 | Partovi | |
| 2014/0276665 A1 | 9/2014 | Lopez et al. | |
| 2014/0327390 A1 | 11/2014 | Park et al. | |
| 2014/0347233 A1 | 11/2014 | Mahanfar et al. | |
| 2014/0350545 A1 | 11/2014 | Moua et al. | |
| 2015/0088115 A1 | 3/2015 | Smith | |
| 2015/0102681 A1 | 4/2015 | Leabman et al. | |
| 2015/0180284 A1 | 6/2015 | Kang et al. | |
| 2015/0326059 A1 | 11/2015 | Abu Qahouq | |
| 2015/0365136 A1 | 12/2015 | Miller et al. | |
| 2016/0072328 A1 | 3/2016 | Cottrill et al. | |
| 2016/0079800 A1 | 3/2016 | Ashinghurst et al. | |
| 2016/0087483 A1 | 3/2016 | Hietala et al. | |
| 2016/0111886 A1 | 4/2016 | Sherman et al. | |
| 2016/0126771 A1 | 5/2016 | Aghassian et al. | |
| 2016/0134140 A1 | 5/2016 | Tittle et al. | |
| 2016/0181854 A1 | 6/2016 | Leabman | |
| 2016/0190856 A1 * | 6/2016 | Baek | H02J 7/04 |
| | | | 320/108 |
| 2016/0192989 A1 * | 7/2016 | Aman | G06Q 10/087 |
| | | | 606/53 |
| 2016/0249910 A1 | 9/2016 | Shelton, IV et al. | |
| 2016/0249918 A1 | 9/2016 | Shelton, IV et al. | |
| 2016/0254694 A1 | 9/2016 | Peterson et al. | |
| 2016/0310077 A1 | 10/2016 | Hunter et al. | |
| 2016/0329614 A1 | 11/2016 | Madan et al. | |
| 2016/0338760 A1 | 11/2016 | Houser et al. | |
| 2016/0352134 A1 | 12/2016 | Pawar et al. | |
| 2017/0085112 A1 | 3/2017 | Leabman | |
| 2017/0110889 A1 | 4/2017 | Bell et al. | |
| 2017/0179763 A9 | 6/2017 | Leabman et al. | |
| 2017/0324267 A1 * | 11/2017 | Decker | H02J 50/12 |
| 2017/0331318 A1 * | 11/2017 | Jankins | H02J 7/0044 |
| 2017/0360976 A1 | 12/2017 | Thomas et al. | |

(56) References Cited

U.S. PATENT DOCUMENTS

2018/0131238 A1 5/2018 Leabman
2018/0372806 A1 12/2018 Laughery et al.

FOREIGN PATENT DOCUMENTS

| | | |
|---|---|---|
| DE | 102014112544 A1 | 3/2016 |
| EP | 1684396 A2 | 7/2006 |
| EP | 2705876 A1 | 3/2014 |
| EP | 2849353 A1 | 3/2015 |
| EP | 3098937 A1 | 11/2016 |
| EP | 3136544 A1 | 3/2017 |
| EP | 3242376 A1 | 11/2017 |
| EP | 3244509 A1 | 11/2017 |
| WO | 03105308 A1 | 12/2003 |
| WO | 2006018231 A1 | 2/2006 |
| WO | 2007050439 A2 | 5/2007 |
| WO | WO2851017 A1 | 3/2015 |
| WO | 2016044651 A1 | 3/2016 |
| WO | 2016118316 A1 | 7/2016 |
| WO | 2016187295 A1 | 11/2016 |
| WO | 2018154138 A1 | 8/2018 |
| WO | 2018192875 A1 | 10/2018 |

OTHER PUBLICATIONS

English language abstract and machine-assisted English translation for DE 37 34 120 extracted from espacenet.com database on May 11, 2020, 6 pages.

English language abstract and machine-assisted English translation for DE 101 09 358 extracted from espacenet.com database on May 11, 2020, 8 pages.

Machine-assisted English language abstract and machine-assisted English translation for DE 10 2014 112 544 extracted from espacenet.com database on May 11, 2020, 10 pages.

English language abstract for WO 2006/018231 extracted from espacenet.com database on May 11, 2020, 2 pages.

English language abstract and machine-assisted English translation for WO 2018/192875 extracted from espacenet.com database on May 11, 2020, 11 pages.

\* cited by examiner

SYSTEM AND METHOD FOR WIRELESSLY CHARGING A MEDICAL DEVICE BATTERY

CROSS-REFERENCE TO RELATED APPLICATIONS

The subject patent application is a National Stage of International Patent Application No. PCT/US2018/052854, filed on Sep. 26, 2018, which claims priority to and all the benefits of U.S. Provisional Patent Application Ser. No. 62/563,245, which was filed on 26 Sep. 2017, the disclosures of which are hereby incorporated by reference in their entirety.

FIELD OF THE DISCLOSURE

This disclosure relates generally to a battery for a medical device. More particularly, it relates to a system and method for wirelessly charging a medical device battery.

BACKGROUND OF THE DISCLOSURE

Non-rechargeable batteries are known as primary batteries while rechargeable batteries are known as secondary batteries. A secondary battery is capable of repeatedly being charged, storing the charge and delivering the charge to a medical device, such as a surgical tool, to which the battery is attached. Secondary batteries have, over the years, evolved into reliable power sources for powered surgical tools used in operating rooms to perform surgical procedures. The use of a battery eliminates the need to provide a power cord connected to an external power source. The elimination of the power cord offers benefits over corded surgical tools. Surgical personnel using this type of tool do not have to concern themselves with either sterilizing a cord so that it can be brought into the sterile surgical field surrounding the patient or ensuring that, during surgery, an unsterilized cord is not inadvertently introduced into the surgical field. Moreover, the elimination of the cord results in the removal of the physical clutter and field-of-view blockage the cord otherwise brings to a surgical procedure.

Batteries used to power surgical tools are exposed to adverse environmental elements to which batteries used for non-medical uses are seldom exposed. For example, during a surgical procedure, a medical battery may be exposed to blood or other body fluid. Tissue removed from the patient may adhere to the battery. To eliminate the risk of patients being infected during the course of the medical procedure, it is therefore a required practice to sterilize the battery or ensure that the battery is housed within a sterilized housing between surgical procedures. Therefore, the batteries must either be sterilizable themselves, or may be non-sterile batteries that have a sterilizable housing in which the batteries are disposed. In the example of sterilizable batteries, the cleaning/sterilization process typically involves rinsing the battery to remove contaminants that are readily visible on the surface of the battery. However, these events may cause a conductive bridge to form between the battery contacts, which can lead to the formation of a layer of metal oxide on one or more of the contacts. This oxide layer functions as an impedance layer that reduces the efficiency of both the charging of the battery and the efficiency of the battery to deliver charge to the tool to which the battery is coupled.

The batteries may also be subjected to immersion in a steam-filled chamber as part of an autoclaving process. To survive the high temperatures present during the autoclave process, specialized batteries must be used. Autoclave temperatures often exceed 130 degrees centigrade. Even with specialized batteries that are designed to withstand autoclave temperatures, damage may still occur to the batteries during the autoclave process (although less damage than would occur with conventional batteries used in other environments). As a result, batteries used in medical environments that are subjected to autoclaving may sustain more damage than batteries used in other industries.

In addition, as batteries may be unused for a period of time before being connected to a surgical tool for use in a procedure, the batteries may gradually lose charge. Accordingly, a battery that started out with a full state of charge may gradually lose charge while disposed in a storage location and may not have a required level of charge when the battery is desired to be used. Health care professionals who use the surgical tools and associated batteries need to have confidence that the batteries used in the tools have a sufficient level of charge and have a sufficient level of health to be used in a surgical procedure or other potentially critical setting.

SUMMARY

In one embodiment, a system for charging a battery is disclosed. The system includes one or more batteries, each battery having a battery controller. The system also includes a container including a plurality of receptacles and a plurality of protrusions, the plurality of receptacles shaped to receive one of the batteries and the plurality of protrusions being aligned with a corresponding receptacle. The system further includes a charging device, which includes a plurality of charging bays, wherein each charging bay is shaped to receive a protrusion of the container and includes a first antenna and a second antenna. The first antenna is configured to establish communication with a battery controller of a battery disposed within a receptacle of the container in response to the battery being within a proximity of the charging bay. The second antenna is configured to provide charging power to the battery disposed in the receptacle. The charging device also includes a charging controller configured to detect whether the first antenna has established communication with the battery in response to the battery being within the proximity of the charging bay and to provide charging power to the battery via the second antenna in response to detecting that the first antenna has established communication with the battery.

In another embodiment, a method of operating a system for charging one or more batteries is disclosed. The system includes one or more batteries, each battery including a battery controller and a container including a plurality of receptacles shaped to receive a battery and a plurality of protrusions being aligned with a corresponding receptacle. The system also includes a charging device comprising a charging controller and one or more charging bays shaped to receive a protrusion. Each charging bay includes a first antenna and a second antenna. The method includes disposing a battery into a receptacle of the plurality of receptacles of the container, placing the container onto the charging device such that a protrusion corresponding to the receptacle is adjacent to a charging bay of the plurality of charging bays and the battery is placed within a proximity of the charging bay. The method also includes communicating with the battery controller of the battery disposed within a receptacle of the container in response to the battery being within the proximity of the charging bay with the first antenna and detecting that the first antenna has established communication with the battery with the charging controller. The method also includes providing charging power to the battery disposed in the receptacle in response to detecting that the first antenna has established communication with the battery with the second antenna.

In another embodiment, a system for charging a battery is disclosed. The system includes a battery comprising a battery controller and a passive communication device coupled to the battery controller. The system also includes a sterile barrier for encasing the battery and a charging device including a charging bay and a charging controller. The charging bay includes a first antenna configured to energize the passive communication device of the battery and to establish communication with the battery controller via the energized passive communication device. The charging bay also includes a second antenna configured to provide charging power to the battery. The charging controller is configured to control the first antenna to energize the passive communication device of the battery and to establish communication with the battery controller via the energized passive communication device while the second antenna is deactivated. The charging controller is also configured to activate the second antenna after the first antenna establishes communication with the battery controller and provide charging power to the battery via the second antenna.

In another embodiment, a method of operating a system for charging a battery is disclosed. The system includes a battery, which includes a battery controller and a communication device coupled to the battery controller. The system also includes a sterile barrier for encasing the battery and a charging device having a charging controller and a charging bay. The charging bay includes a first antenna and a second antenna. The method includes encasing the battery with the sterile barrier and placing the sterile barrier onto the charging device. The method also includes energizing the communication device of the battery with the first antenna and establishing communication with the battery controller via the energized communication device with the first antenna. The method further includes activating the second antenna with the charging controller after the first antenna establishes communication with the battery controller and providing charging power to the battery with the second antenna.

In another embodiment, a system for charging a battery is disclosed. The system includes one or more batteries, each battery including a battery controller. The system also includes one or more sterile barriers for encasing the one or more batteries, such that a battery of the one or more batteries is encased in a sterile barrier of the one or more sterile barriers. The system also includes a charging device having one or more charging bays, the charging bays including a first antenna and a second antenna. The first antenna is configured to establish communication with a battery controller of the battery encased in the sterile barrier in response to the battery being within a proximity of the charging bay. The second antenna is configured to provide charging power to the battery encased in the sterile barrier. The charging device also includes a charging controller configured to detect whether the first antenna has established communication with the battery in response to the battery being within the proximity of the charging bay and provide charging power to the battery via the second antenna in response to detecting that the first antenna has established communication with the battery.

In another embodiment, a system for charging a battery is disclosed. The system includes a battery having a passive communication device and a battery controller coupled to the passive communication device, the battery controller being configured to place the battery in a low-power state. The system also includes a container comprising a receptacle shaped to receive the battery and a protrusion being aligned with the receptacle. The system further includes a charging device having a charging bay shaped to receive the protrusion and a charging controller. The charging bay includes one antenna configured to energize the passive communication device of the battery, establish communication with the battery controller via the energized passive communication device, and provide charging power to the battery. The charging controller is configured to control the antenna to energize the passive communication device of the battery and to establish communication with the battery controller via the energized passive communication device such that the battery controller causes the battery to exit the low-power state in response to the communication being established. The charging controller is also configured to receive authentication data to authenticate the battery via the established communication in response to the battery controller causing the battery to exit the low-power mode and provide charging power to the battery via the antenna in response to authenticating the battery.

In another embodiment, a system for charging a battery is disclosed. The system includes a first container and a and second container. The first and second containers include a plurality of receptacles and a plurality of protrusions, each receptacle shaped to receive a battery and each protrusion being aligned with a corresponding receptacle, wherein the number of receptacles and the number of corresponding protrusions in the first container is greater than the number of receptacles and the number of corresponding protrusions in the second container. The system also includes a charging device including a plurality of charging bays, wherein each charging bay is shaped to receive a protrusion of the first or the second container, the plurality of charging bays being arranged in a plurality of rows and a plurality of columns, the number of columns corresponding to the number of receptacles in the first container and the number of rows corresponding to the number of receptacles in the second container. Each charging bay includes an antenna configured to provide charging power to the battery disposed in a receptacle. The charging device also includes a charging controller configured to provide charging power to the battery disposed in the receptacle via the antenna.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

DETAILED DESCRIPTION

Figure 1:
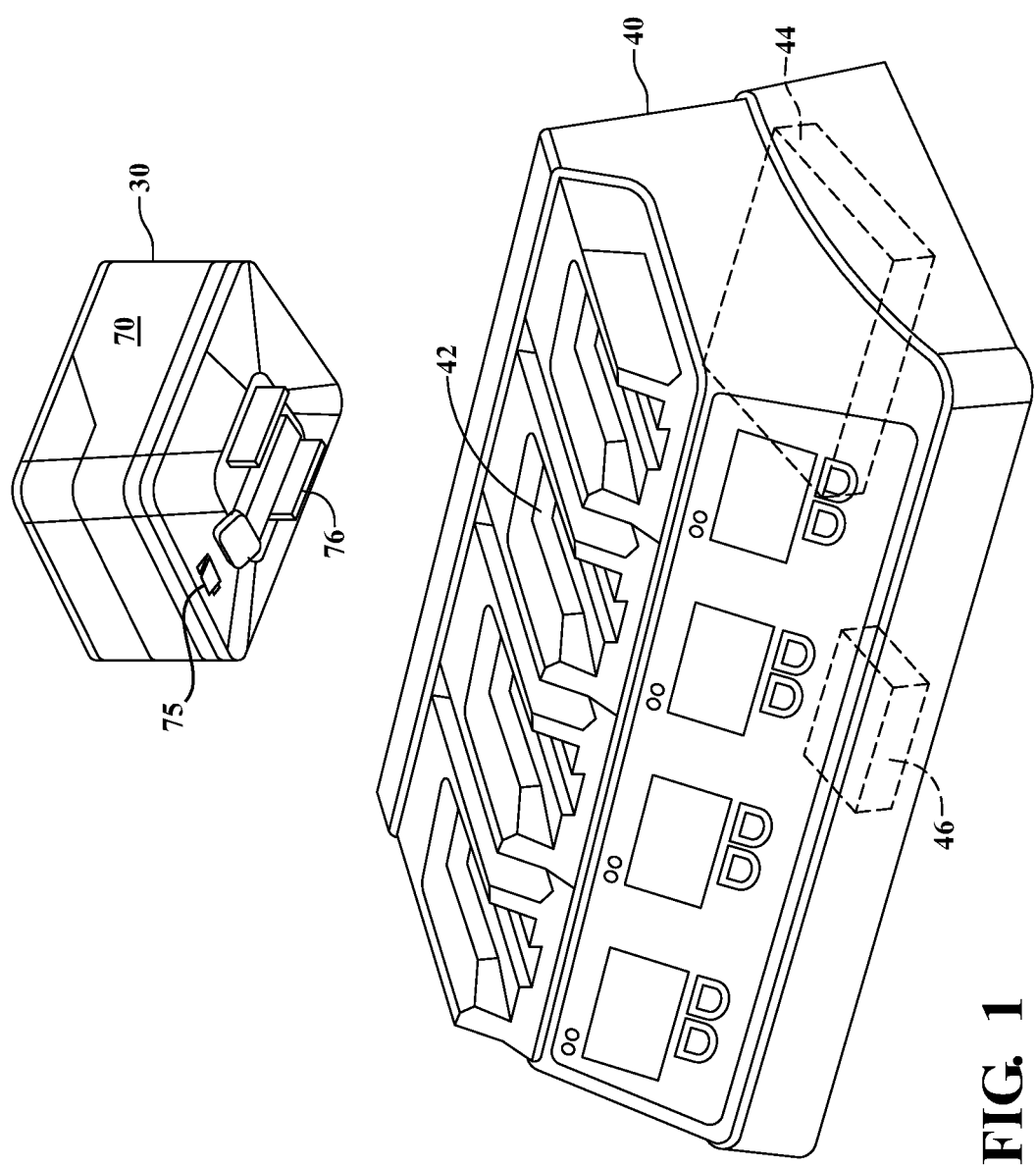
FIG. 1 is a perspective view of an embodiment of a battery and a charger.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The present disclosure particularly describes an autoclaveable battery that is capable of being charged by a wireless charging module having at least one charging bay. The battery may be sterilized and placed in a battery container that is capable of being sterilized and retaining a sterile state of a volume contained therein. In other words, the battery container provides a barrier such that the contents within the battery container are maintained in a sterile state until the battery container has been opened. The battery container may then be transported to the charging module and the battery may be charged while remaining in the sterile volume. The battery may also communicate with the charging module while the battery remains in the sterile volume. While the battery is being transported to the charging module, the battery and its internal components may be in a low power state.

When the battery is placed in proximity to the charging bay, a communication antenna associated with the charging bay generates an electromagnetic field that is used to communicate with a battery communication device. A power antenna is also associated with the charging bay and may be disabled when the communication antenna is enabled. In one embodiment, the battery communication device includes a near-field communication (NFC) tag with an integrated antenna. In other embodiments, other tags such as RFID tags or other suitable circuits coupled to an antenna may be used. The antenna is energized by the electromagnetic field and the battery communication device exits the low power state to pair with the charging module. In one embodiment, all other components of the battery, such as the battery controller, charging circuit, etc., may exit the low power state when the tag antenna is energized or when the battery is paired with the charging module.

After the battery and charging module have been paired, the charging module receives battery state data, such as battery state of charge data and battery state of health data, from the tag. The charging module may indicate the battery state data on one or more indicators, such as within a display area of the module. The charging module may also receive battery operational data from the tag.

When the charging module has received the battery state data and/or the battery operational data, the charging module may determine whether the battery is ready to charge by transmitting an associated request to the battery. If the battery responds to the request with a message indicating that it is ready to charge, the charging module begins a charging process.

The charging module may begin the charging process by disabling the communication antenna and enabling the power antenna of the charging bay associated with the battery. The power antenna generates an electromagnetic field that inductively couples to a corresponding antenna within the battery. Charging power is then provided from the charger power antenna to the battery antenna to charge the battery cells. After a predetermined time has elapsed, the charger controller may disable the power antenna, re-enable the communication antenna, and begin the process again by pairing the charging device to the battery using the communication antenna and battery communication device. In this way, the charger controller may periodically receive updated data from the battery to determine whether additional power should be wirelessly provided to the battery.

With the foregoing summary in mind, additional details of the battery are described with reference to FIGS. 1-6. A medical device that may be used with the battery is described with reference to FIG. 2. A charging module that may be used to provide charge to the battery is described with reference to FIGS. 4 and 7. A data structure for storing data relating to the battery and the charging cycle is described with reference to FIG. 6. A battery container for transporting the battery while maintaining a sterile volume is described with reference to FIGS. 8 and 9. A method for charging the battery is described with reference to FIGS. 10-12.

FIG. 1 illustrates a battery 30 and a charging module 40 according to an embodiment. Internal to the battery are one or more rechargeable cells (shown in FIG. 3) capable of storing electrical charge. In an exemplary configuration, charging module 40 has at least one socket 42 shaped to releasably hold the battery. Internal to the charging module 40 is a power source, illustrated by phantom rectangular block 44. Also internal to the charging module 40 is a charger controller, illustrated by phantom rectangular block 46. When battery 30 is coupled to the charging module 40, the power source 44 applies a charging current to the battery cells 32. Charger controller 46 regulates the charging of the battery by power source 44. The charger controller 46 also is capable of retrieving data from and writing data to memories internal to the battery 30. Various other charger configurations are contemplated.

Figure 2:
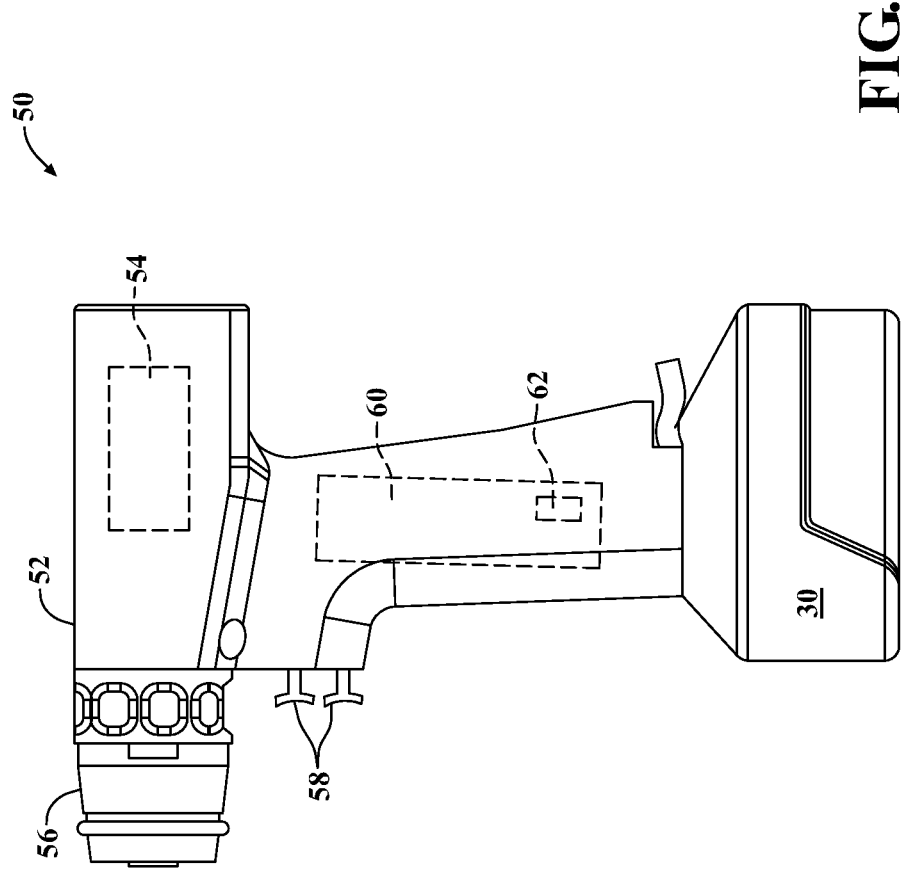
FIG. 2 is a plan view of the battery attached to a power consuming device.

FIG. 2 illustrates a power consuming medical device 50 coupled to the battery 30. As shown in FIG. 2, the medical device is a powered surgical tool 50 (sometimes referred to as a surgical handpiece) for performing a surgical procedure. In other embodiments, medical device 50 may be a tethered surgical headpiece, or may be any other instrument powered by battery 30 and that is otherwise adapted for use by medical professionals, such as, without limitation, lights, cameras, speakers, microphones, sensors, and the like. For the purposes of clarity and consistency, subsequent description of the medical device 50 will generally be made with reference to the powered surgical tool, which is depicted throughout the drawings and which is described in greater detail below. Thus, unless otherwise indicated, the description of the various components and features of the surgical tool described herein also apply to other types of medical devices.

In the illustrated embodiment, tool 50 has a housing 52 that is pistol shaped. The aft end of the tool housing 52 is shaped to releasably receive the battery 30. A powered surgical tool 50 includes a power generating component that converts the electrical energy drawn from the battery cells 32 into another form of energy useful for performing a medical or surgical procedure. In the illustrated embodiment, the power generating component or unit is a motor represented by dashed rectangle 54. Many power surgical tools have a coupling assembly, represented by ring 56. The coupling assembly 56 releasably attaches an energy applicator to the power generating component. The energy applicator is the device that actually applies the energy output by the power generating unit to the target site where the medical procedure is being performed. If the power generating unit 54 is a motor, the energy applicator may be what is referred to as a cutting accessory. For simplicity, the tool power generating component is referred to below as motor 54 even though other tools may have other power generating devices that draw current to function.

Tool 50 also includes at least one manually actuatable control member. The depicted tool 50 has two triggers 58. The triggers 58 are depressed by the practitioner to regulate the actuation of the tool. Also internal to the tool is a control module 60. The control module 60 includes components that monitor the actuation of the triggers 58. Other components internal to the control module, in response to the actuation of the triggers 58, selectively connect the battery cells 32 to the tool motor 54. One of these other components internal to control module 60 is a tool processor 62.

Figure 3:
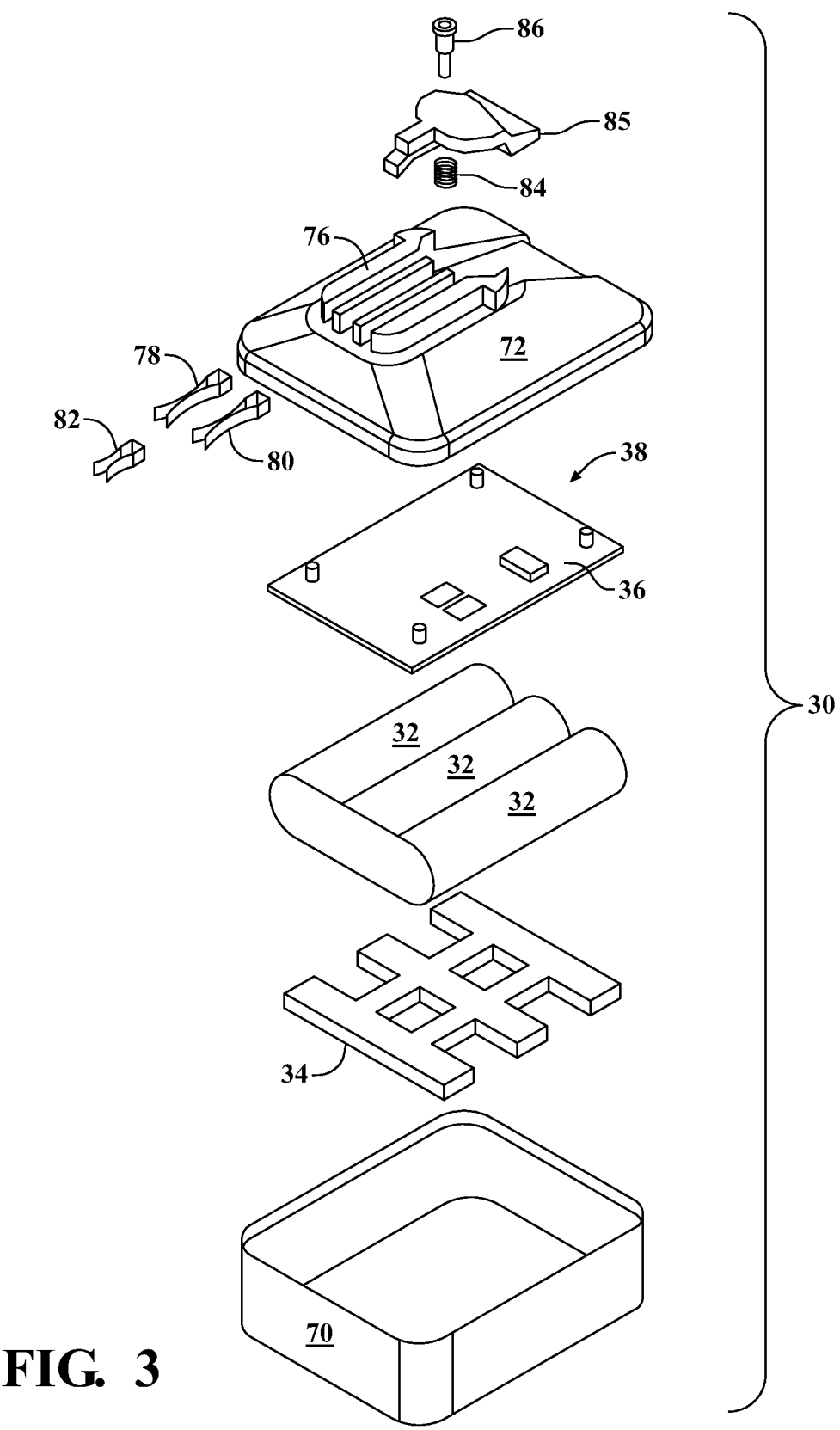
FIG. 3 is an exploded view of the battery.

As seen in FIG. 3, the exemplary battery 30 includes a shell 70 that includes one or more rechargeable cells 32 seated therein. In one embodiment, the cells 32 are connected together in series to form a cell cluster. The cell cluster is seated on a foam pad 34 disposed in the base of shell 70. A lid 72 is sealing disposed over the open top end of the shell 70. If the battery 30 is intended for medical/surgical use, the lid 72 may be attached to the shell 70 so the shell 70 and lid 72 collectively form an autoclaveable housing. The lid 72 may be formed with a battery head 76. Battery head 76 is dimensioned to fit in the charger socket 42 and/or against the aft end of the tool housing 52. The battery head 76 is provided with power contacts 78 and 80 and (optionally) a data contact 82. Power contacts 78 and 80 are the conductive members through which the surgical tool 50 draws an energizing current. Contact 78 is the cathode and contact 80 is the anode of the battery 30. In an embodiment in which one or more data contacts 82 are included, data and instruction signals are written into and read out from the battery 30 through data contact 82. Battery 30 may thus use the data contact 82 to exchange data and instructions with tool processor 62. These signals are exchanged using a suitable wired communication protocol. In other embodiments, data contact 82 may be omitted, and data and instructions may be written into and read out from battery 30 wirelessly. In some embodiments, battery head 76, power contacts 78 and 80, and data contact 82 may be omitted from the lid 72 and from the battery 30.

A latch 85 is pivotally mounted to the battery lid 72. The latch 85 holds the battery 30 to the aft end of tool housing 52. A pin 86 holds latch 85 to the lid 72. A spring 84 biases one portion of the latch 85 away from the adjacent surface of the lid 72.

Mounted to the cell cluster so as to be disposed between the cells 32 and lid 72 is a circuit board 36. Circuit board 36 holds the below described components that selectively connect cells 32 to the anode contact 80 and the cathode contact 78. In one embodiment, the circuit board 36 includes, or is coupled to, a battery controller 38 that controls the operation of the battery as described more fully herein.

In exemplary embodiments, cells 32 are lithium ion cells. For example, cells 32 may include any suitable nickel or lithium chemistry cell, including but not limited to, lithium ion ceramic cells, lithium iron phosphate, lithium iron phosphorous oxynitride cells, lithium ion nickel magnesium cobalt, or lithium tin phosphorous sulfide cells. In alternative embodiments, cells 32 may be lead acid, or any other suitable type of cell. Each cell, when properly charged, has a nominal cell voltage of 3.3 VDC for lithium iron phosphate. In many but not all embodiments, the cells are connected together in series. In the illustrated embodiment, battery 30 includes three series connected cells 32. This version of battery 30 is therefore configured to output a potential of around 9.9 VDC. Alternatively, in some embodiments, at least some of the battery cells 32 may be connected together in parallel.

The physical structure of the battery 30 may also be different from what is described and illustrated. For example, one or more of the contacts 78 and 80 may be mounted directly to the housing 52 as opposed to the lid 72. Likewise, the circuit board 36 that holds the electrical components internal to the battery 30 may be mounted to the housing 52 or lid 72 instead of being mounted to the cell cluster.

Figure 4A:
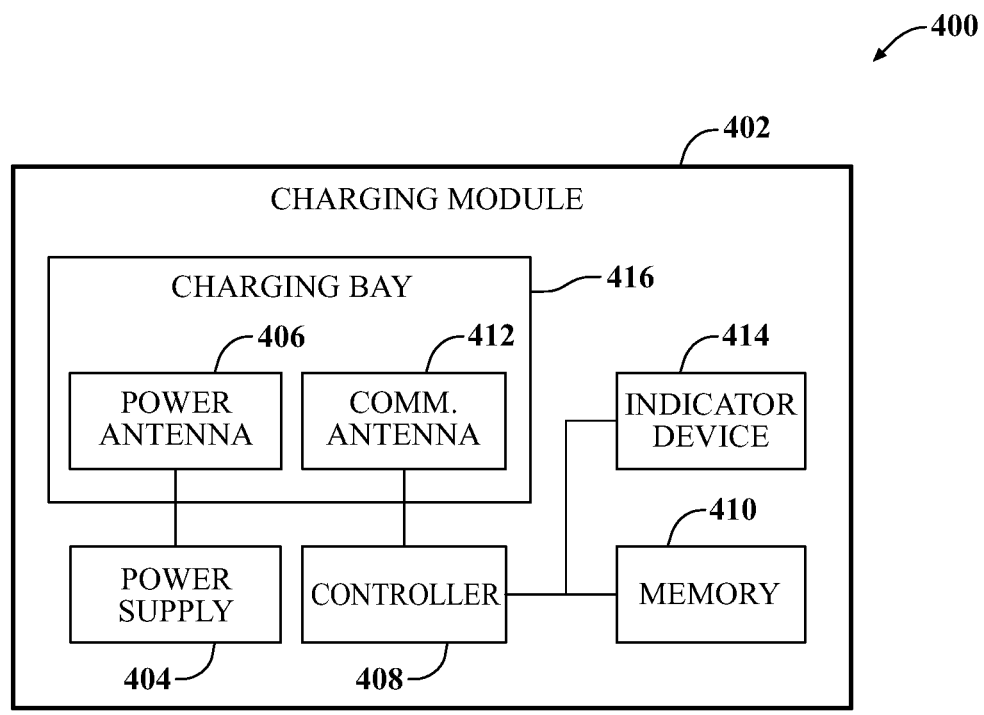
FIG. 4A is a block diagram of an embodiment of a system that includes a battery and a wireless charging module.
Figure 4A:
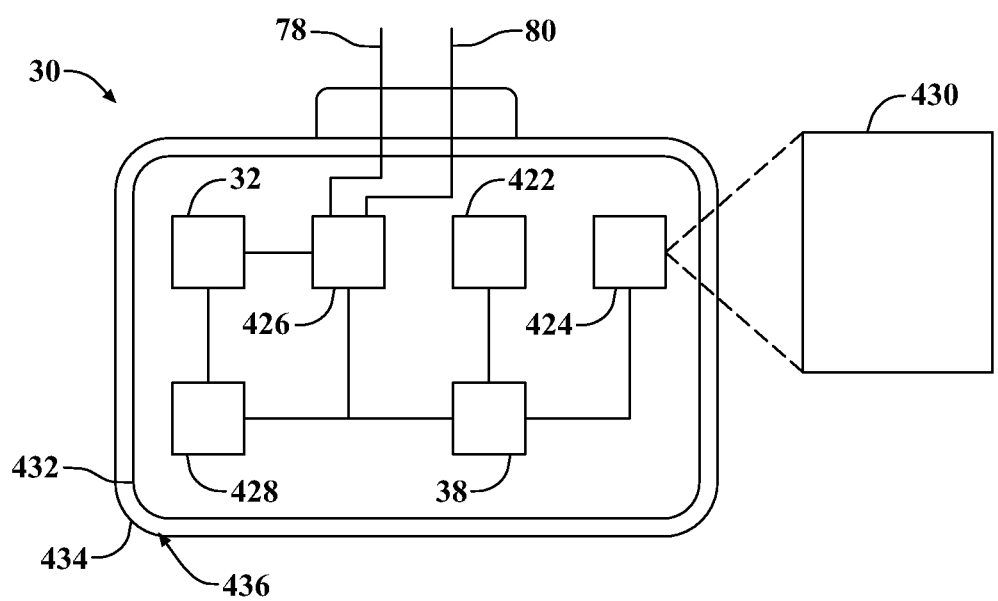
Figure 4B:
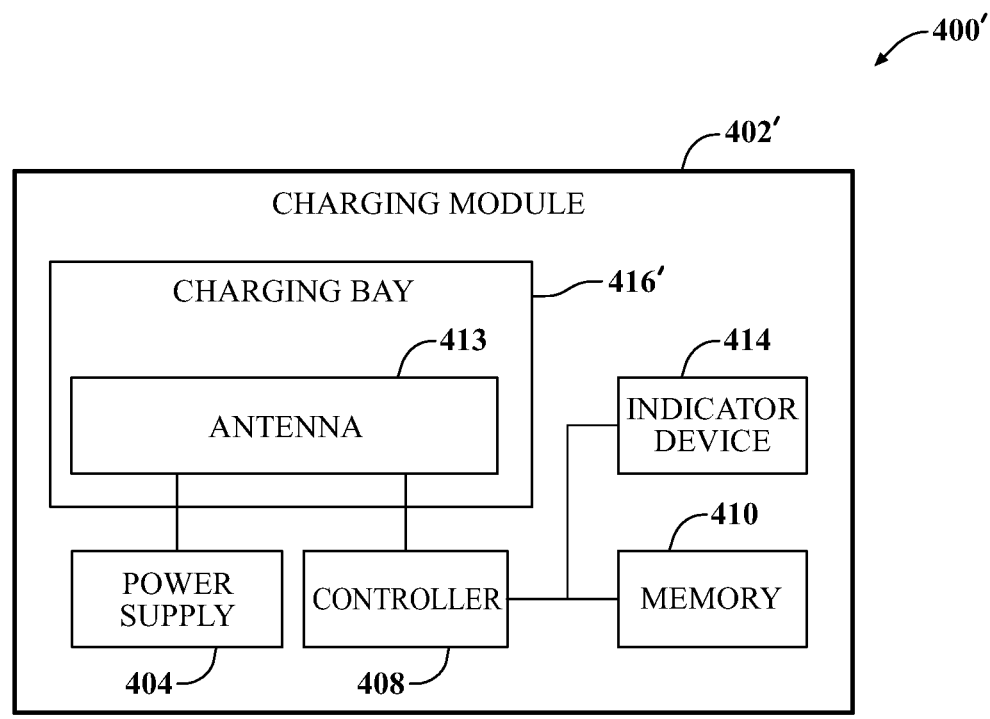
FIG. 4B is a block diagram of an embodiment of the system that includes the battery and another embodiment of the wireless charging module.
Figure 4B:
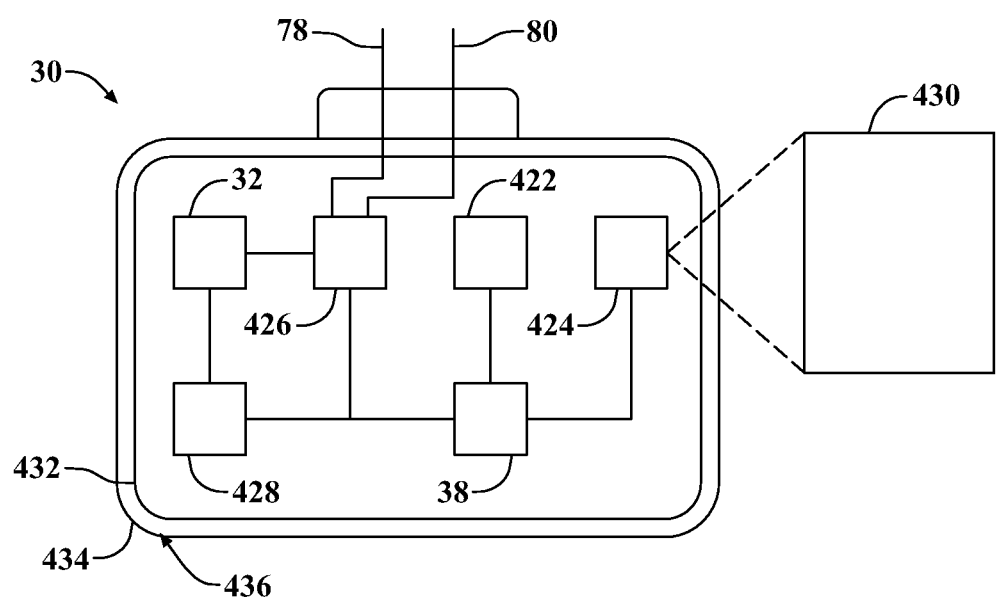

FIG. 4A is a block diagram of a system 400 including a charging module 402 and a battery 30. In the embodiment shown in FIG. 4A, the charging module 402 is a wireless charging module that provides a wireless charging signal to battery 30 to wirelessly charge battery 30. FIG. 4B is a block diagram of system 400', another embodiment of system 400. System 400' includes charging module 402', which is an embodiment of charging module 402, and the battery 30. In the embodiment shown in FIG. 4B, the charging module 402' is also a wireless charging module that provides a wireless charging signal to battery 30 to wirelessly charge battery 30.

As illustrated in FIG. 4A, charging module 402 includes a power supply 404, a charger controller 408, a memory 410, and one or more indicator devices 414. The charging module 402 also includes a charging bay 416, which includes a charger power antenna 406 and a charger communication antenna 412. In one embodiment, charging module 402 is a charging device such as charging module 40 (shown in FIG. 1). In other embodiments, charging module 402 may be a wireless mat, tray, inspection station, or other charging surface that battery 30 may be placed upon to wirelessly charge battery 30. Alternatively, charging module 402 may be embedded in tool 50 or another suitable device.

As illustrated in FIG. 4B, charging module 402' includes the power supply 404, the charger controller 408, the memory 410, and the one or more indicator devices 414. However, charging module 402' also includes charging bay 416', which is an embodiment of charging bay 416. Charging bay 416' includes one antenna 413, which is configured to perform the tasks of power antenna 406 and charger communication antenna 412. As such, antenna 413 may be configured to perform any task that the power antenna 406 and the charger communication antenna 412 are described as performing herein. In some embodiments, the charging module 402' may be a Wireless Power Consortium (Qi) charger.

Power supply 404 converts line current into signals that can be used to energize other components of charging module 402. In FIG. 4A, power supply 404 also produces a signal that is applied to charger power antenna 406 to enable antenna 406 to provide wireless charging power to battery 30. In FIG. 4B, power supply 404 similarly produces a signal that is applied to antenna 413 to enable antenna 413 to provide wireless charging power to battery 30.

Charger power antenna 406 of FIG. 4A receives the signal from power supply 404 and converts the signal to a wireless charging signal that is wirelessly transmitted to battery 30. The wireless charging signal is a radio frequency (RF) signal that is receivable by an antenna 422 of battery 30. Accordingly, charger power antenna 406 acts as a transmission component that transmits the charging signal to battery 30. Similarly, antenna 413 of FIG. 4B may be configured to receive the signal from power supply 404, convert the signal to a wireless charging signal that is wirelessly transmitted to battery 30, and transmit the charging signal to battery 30.

In one embodiment, charger controller 408 may operate a switching device (not shown), such as a transistor, switch, or other device, to selectively enable and disable power antenna 406. Accordingly, in an embodiment in which communication antenna 412 is activated, charger controller 408 may control the switching device to deactivate power antenna 406, such as by preventing current from entering power antenna 406. Similarly, the charger controller 408 may selectively enable and disable an ability of the antenna 413 to receive the signal from power supply 404, convert the signal to a wireless charging signal that is wirelessly transmitted to battery 30, and/or transmit the charging signal to battery 30.

Charger controller 408 may include a processor that regulates the power supply 404 to provide the signal having a suitable current, voltage, and frequency to the charger power antenna 406. Charger controller 408 controls the provision of the charging signal to battery 30 in response to the battery 30 requesting additional charge (referred to herein as a charging request), for example. When charger controller 408 receives a charging request from battery 30, charger controller 408 may determine if battery 30 has a sufficient level of health to be charged. In one embodiment, charger controller 408 compares battery state of health data received from battery 30 with a predetermined threshold. If the battery state of health data meets or exceeds the predetermined threshold, charger controller 408 approves the charging request and commands the power supply 404 to provide the charging signal to battery 30 via charger power antenna 406 or antenna 413.

Memory 410 is a computer-readable memory device or unit coupled to charger controller 408. In one embodiment, memory 410 is a non-volatile random access memory (NOVRAM), such as flash memory. Memory 410 includes charging sequence and charging parameter data that, when executed by charger controller 408, regulates the wireless charging of battery 30. In one embodiment, memory 410 also stores data indicating a state of health and/or state of charge of the battery 30. For example, in one embodiment, battery 30 transmits data representative of the state of health and/or state of charge of battery 30 to charger communication antenna 412. Charger communication antenna 412 transmits the state of health and state of charge data to charger controller 408, which then stores the data in memory 410. In an embodiment where the memory 410 is a flash memory, such as flash memory 504 (further described herein), the charger communication antenna 412 may receive the data representative of the state of health and/or the state of charge of battery 30 when the battery 30 is unpowered and/or without communicating with the battery controller 38.

Charger communication antenna 412 may be configured to communicate bi-directionally with battery communication device 424. In one embodiment, charger communication antenna 412 receives battery state of health and/or state of charge data from memory 410 and provides the data to charger controller 408. In addition, charger communication antenna 412 may receive a charging request from battery 30 and may transmit the charging request to charger controller 408. Similarly, antenna 413 of FIG. 4B may be configured to communicate bi-directionally with battery communication device 424, receive battery state of health and/or state of charge data from memory 410, provide the data to charger controller 408, receive a charging request from battery 30, and transmit the charging request to charger controller 408.

In one embodiment, charger controller 408 may operate a switching device (not shown), such as a transistor, switch, or other device, to selectively enable and disable communication antenna 412. Accordingly, in an embodiment in which power antenna 406 is activated, charger controller 408 may control the switching device to deactivate communication antenna 412, such as by preventing current from entering communication antenna 412. Similarly, the charger controller 408 may selectively enable and disable an ability of the antenna 413 to communicate bi-directionally with battery communication device 424, receive battery state of health and/or state of charge data from memory 410, provide the data to charger controller 408, receive a charging request from battery 30, and transmit the charging request to charger controller 408.

Indicator devices 414 indicate a status of charging module 402 and/or battery 30. Indicator device 414 may include at least one of a display, a speaker, and a light source, such as a light-emitting diode (LED). The display may be an LCD, LED, or other type of display. In some embodiments, multiple indicators may be used to indicate the status of charging module 402, 402' and/or battery 30. As illustrated in FIG. 4, indicator device 414 is one or more LEDs. In one embodiment, charger controller 408 may activate one or more indicator devices 414 based on the battery state of health and/or state of charge data received from battery 30. For example, charger controller 408 may cause an LED to emit a green color (or another suitable color) if the battery state of health data meets or exceeds the predetermined threshold. Charger controller 408 may cause an LED to emit a red color (or another suitable color) if the battery state of health data is less than the predetermined threshold. Indicator devices 414 thus can indicate to a user the overall health status of the battery 30. Indicator devices 414 may additionally or alternatively be used to indicate a state of charge of battery 30. For example, indicator devices 414 may include one or more LEDs or other light sources that emit a first color of light when battery 30 is not fully charged, and may emit a second color of light when battery 30 is fully charged. It is further contemplated that the battery 30 may include one or more indicator devices 414 that indicate the battery state to a user, and as such, the battery 30 itself may include a light source, display, or speaker.

In one embodiment, charging module 402 may include a plurality of charging bays 416 that each includes a separate power antenna 406 and communication antenna 412. Similarly, charging module 402' may include a plurality of charging bays 416' that each include an antenna 413. Accordingly, each charging bay 416 and 416' may be shaped and sized to receive a separate battery 30 as described more fully herein. For example, the charging modules 402, 402' may include two charging bays 416, 416', respectively, of a similar shape, or two or more charging bays 416, 416', respectively, of different shapes to accommodate batteries having different shapes and/or sizes. Each charging bay 416 may therefore communicate with a respective battery 30 that is placed within, or proximate to, charging bay 416 via communication antenna 412, and may provide charging power to battery 30 via power antenna 406. Similarly, each charging bay 416' may communicate with a respective battery 30 that is placed within, or proximate to, charging bay 416' via antenna 413, and may provide charging power to the battery 30 via antenna 413. Each charging bay 416 and 416' may be configured as a recessed volume within the surface of the charger. Alternatively still, the charger modules 402, 402' may include a plurality of charging bays 416, 416', respectively, each being shaped and sized identically.

In an embodiment, each power antenna 406 of each charging bay 416 may only provide charging power when a battery 30 is placed within, or proximate to, charging bay 416. Accordingly, when a battery 30 is not placed within, or proximate to, charging bay 416 (i.e., if charger controller 408 does not detect the proximity of battery 30 with respect to charging bay 416), charger controller 408 may deactivate or otherwise disable power antenna 406 of that charging bay 416 to conserve power.

As illustrated in FIGS. 4A and 4B, battery 30 includes a plurality of components including battery controller 38, an antenna 422, one or more cells 32, a battery communication device 424, a gate 426, and a charging circuit 428. Battery 30 may also include a tag 430, such as an NFC or RFID tag, that may be used to communicate with charging module 402. The battery components described herein may be included within a circuit board, such as circuit board 36 (shown in FIG. 3). In one embodiment, tag 430 is a passive tag that is inductively powered via an electromagnetic field, such as a field generated by communication antenna 412 of charging module 402.

Battery controller 38 may be, or may include, any suitable controller, microcontroller, or microprocessor. Battery controller 38 includes a plurality of different sub-circuits which are described in FIG. 5. In one embodiment, battery controller 38 controls when battery 30 is placed into a low power state and when battery 30 exits the low power state, as described herein.

Antenna 422 is configured to receive the wireless charging signal from charging module 402. Specifically, antenna 422 is configured to receive the charging signal from power antenna 406 of charging module 402 and is configured to convert the signal to a current that is transmitted to charging circuit 428 for use in charging cells 32.

Cells 32 are used for storing charge within battery 30. In one embodiment, the cells 32 may be high-temperature cells configured to sustain functionality without damage or with reduced damage during sterilization (e.g., during an autoclave process). The cells 32 may include thermal insulation to minimize damage incurred during sterilization or autoclave cycles. The thermal insulation may include an aerogel, such as polyimide, silica, or carbon aerogel. The number and type of cells 32 internal to the battery may of course be different from what is described.

Battery communication device 424 may be a transceiver which allows battery controller 38 to connect to tool 50, charging module 402, and/or a computing device, such as a tablet or server. In one embodiment, battery communication device 424 may include tag 430. Alternatively, battery communication device 424 and tag 430 are separate devices. Battery communication device 424 may be a radio frequency (RF) or infrared (IR) transceiver. In some embodiments, battery communication device 424 may be a Bluetooth transceiver. When battery 30 is connected to tool 50 or charging module 402, battery communication device 424 exchanges signals with a complementary transceiver within tool 50 (or within another suitable medical device) or within charging module 402. In an embodiment in which battery communication device 424 is a wireless transceiver, battery communication device 424 may wirelessly transmit and receive data using any wireless protocol and/or technology, including but not limited to ZigBee, Bluetooth, Wi-Fi, etc. Alternatively, battery communication device 424 may be a wired transceiver that transmits data to and from tool 50 and/or a computing device using a suitable wired protocol. A user may send and/or receive data from battery 30, charging module 402, and/or tool 50 using battery communication device 424.

Battery communication device 424 may transmit authentication data to a medical device communication module (not shown) and/or may receive authentication data from the medical device communication module to authenticate tool 50 and/or battery 30. In a similar manner, battery communication device 424 may transmit authentication data to charging module 402 to enable charging module 402 to authenticate battery 30. Accordingly, battery 30, charging module 402, and/or tool 50 may ensure that only authorized and/or compatible components are being used with each other.

Gate 426 includes one or more circuit components that selectably couple cells 32 to contacts 78 and 80. In one embodiment, gate 426 includes one or more transistors, such as field effect transistors, that are activatable by battery controller 38 to electrically couple cells 32 to contacts 78 and 80 such that cells 32 are selectively in communication with cathode contact 78 and anode contact 80.

Charging circuit 428 includes one or more circuit components that facilitate charging, or providing charge or current to, cells 32. In one embodiment, when battery 30 receives a charging signal from a charging module or device 402, 402', antenna 422 converts the charging signal to a current that is provided to charging circuit 428. Accordingly, charging circuit 428 receives the charging signal from the charging module or device 402, 402' through antenna 422.

Charging circuit 428 may receive the current and may adjust the current and/or voltage to conform to a desired current or voltage of cells 32. When the cells 32 have been charged to a maximum or predefined state of charge, battery controller 38 may control charging circuit 428 to prevent further current from being provided to cells 32.

In one embodiment, battery communication device 424 may include a tag 430 having an integrated antenna (not shown) for use in communicating with charging module 402. Alternatively, tag 430 may be coupled to battery communication device 424 or may be a standalone component with an integrated antenna. In some embodiments, battery data, such the state of health, state of charge, and/or battery operational data of battery 30, may be stored in tag 430 and may be transmitted to charging module 402 via NFC, RFID, or any other suitable communication protocol.

The various components of battery 30 are positioned within a housing 432. The housing 432 may include a cover 434 that may be welded to the housing 432 to form a unitary structure to form a seamless bond. In addition, a seal 436 may be positioned between housing 432 and cover 434 to form a hermetic barrier between cover 434 and housing 432. Seal 436 may be formed of a material that is autoclaveable and, optionally, compressible. For example, seal 436 may include EPDM rubber or silicon rubber.

Contacts 78 and 80 may be mounted to cover 434. While contacts 78 and 80 are illustrated in FIGS. 4A and 4B as extending from cover 434, it should be recognized that contacts 78 and 80 may be partially or completely housed within cover 434 and/or housing 432 such that a corresponding contact from tool 50 inserts into cover 434 and/or housing 432 to connect to contact 78 and contact 80. Contact 78 is sometimes referred to as a cathode contact. Contact 80 is sometimes referred to as an anode contact. Contacts 78 and 80 (and cover 434) are shaped and physically adapted to enable battery 30 to removably couple to tool 50. More specifically, contacts 78 and 80 are physically adapted to be inserted into a corresponding portion of tool 50 to establish physical and electrical connection with tool 50. Thus, when cathode contact 78 and anode contact 80 are inserted into tool 50 and contacts 78 and 80 are activated such that a voltage is applied across anode contact 80 and cathode contact 78, battery 30 provides power to tool 50.

Housing 432 of battery 30 may include a material suitable for autoclave cycles. The battery assembly, including the battery components, housing 432, and cover 434, is configured to be sterilized, together with or separately from the tool 50, via steam sterilization, hydrogen peroxide sterilization, or other suitable sterilization technique. By "sterile," it is meant that, once the process is complete, the housing 432 or cover 434 has a sterilization assurance level (SAL) of at least $10^{-6}$. This means that there is equal to or less than one chance in a million that a single viable microorganism is present on the sterilized item. This definition of sterile is the definition set forth in the ANSI/AAMI ST35-1966, entitled "Safe Handling and Biological Decontamination of Medical Devices in Health Care Facilities and Nonclinical Settings". For alternative applications, the "sterilization" process is sufficient if, once the process is complete, the housing 432 or cover 434 has an SAL of at least $10^{-4}$.

Also, while many versions of the battery 30 include a housing 432 or cover 434 that is autoclaveable, that need not always be the case. This feature is often not part of the design of a battery that is not designed for medical/surgical use. Likewise, the features of this battery 30 may be incorporated into what is often referred to as a non-sterile battery in an aseptic housing. A non-sterile battery in an aseptic housing includes a cell cluster and a circuit board to which the electrical components such as the cell regulator (voltage regulator), the transistors (e.g., FETS), the resistors, capacitors, and microprocessor or battery controller are monitored. This cell cluster is not autoclaveable. Instead, the cell cluster can be removably fitted into a housing that is autoclaveable. Once the cell is fitted in the housing, the housing is sealed. The cells and other cluster-forming components are thus encapsulated in a sterilized enclosure. Contacts integral with both the cell cluster and the housing provide the contact path over which current is sourced from the battery. A further understanding of the structure of a non-sterile battery assembly in an aseptic housing can be obtained from U.S. Pat. No. 7,705,559 B2, entitled "ASEPTIC BATTERY WITH A REMOVAL CELL CLUSTER, THE CELL CLUSTER CONFIGURED FOR CHARGING IN A SOCKET THAT RECEIVES A STERILIZABLE BATTERY" and PCT Pub. No. WO 2007/090025 A1, entitled "ASEPTIC BATTERY ASSEMBLY WITH REMOVABLE, RECHARGEABLE BATTERY PACK, THE BATTERY PACK ADAPTED TO BE USED WITH A CONVENTIONAL CHARGER", the disclosures of which are incorporated herein by reference.

Some batteries are also provided with supplemental components. These components may include internal sensors, data collection circuits, memories or control processors. These components may monitor the environment to which the battery is exposed, store data regarding the use of the battery, and/or store data regarding the medical device to which the battery is attached. The supplemental components may include or be similar to the supplemental components described in U.S. Pat. No. 6,018,227 A, entitled "BATTERY CHARGER ESPECIALLY USEFUL WITH STERILIZABLE RECHARGEABLE BATTERY PACKS", and U.S. Pat. Pub. No. 2007/0090788 A1/PCT Pub. No. WO 2007/050439 A2, entitled "SYSTEM AND METHOD FOR RECHARGING A BATTERY EXPOSED TO A HARSH ENVIRONMENT", the disclosures of which are incorporated herein by reference. When a battery is provided with one or more of these supplemental components, the battery housing may include a supplemental contact (e.g., data contact 82). This supplemental contact may be the contact through which signals are received from and/or transmitted to the supplemental components.

Figure 5:
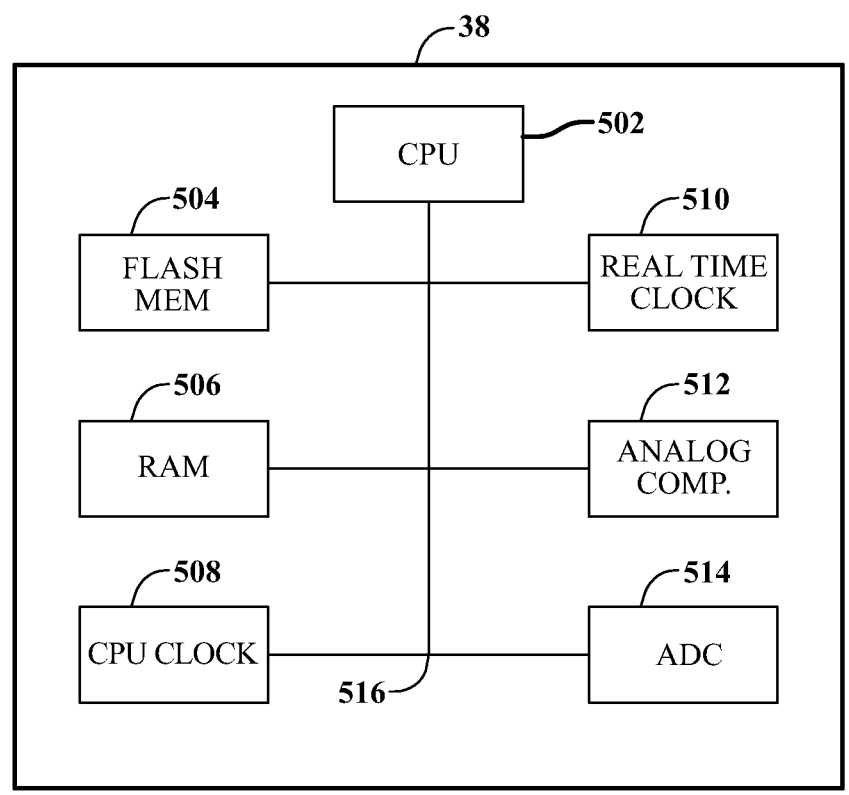
FIG. 5 is a block diagram of various sub-circuits internal to the battery controller.

FIG. 5 is a block diagram illustrating various subcircuits or components of battery controller 38. While the following subcircuits or components are illustrated in FIG. 5 as being included within battery controller 38, it should be recognized that one or more of the subcircuits or components may be included within any suitable device, module, or portion of battery 30.

In an exemplary embodiment, a central processing unit (CPU) 502 controls the operation of battery controller 38 and the components connected to the battery controller. A non-volatile flash memory 504 stores instructions executed by the CPU 502. As described more fully herein, flash memory 504 also stores the instructions used to regulate the charging of the battery 30, data describing the use history of the battery 30, and data describing the use history of the tool 50 to which the battery 30 is attached.

A random access memory 506 functions as a temporary buffer for data read and generated by battery controller 38. A CPU clock 508 supplies the clock signal used to regulate the operation of the CPU 502. While shown as single block for purposes of simplicity, it should be appreciated that CPU clock 508 includes an on-chip oscillator as well as subcircuits that convert the output signal from the oscillator into a CPU clock signal. A real time clock 510 generates a clock signal at fixed intervals.

In one embodiment, an analog comparator 512 and an analog to digital converter (ADC) 514 are used to process output signals of one or more sensors or other components of battery 30, such as a temperature sensor (not shown). In FIG. 5, the above sub-circuits are shown interconnected by a single bus 516. It should be appreciated that this is for simplicity. In practice, dedicated lines may connect certain of the sub circuits together. Likewise, it should be understood that battery controller 38 may have other sub-circuits. These sub-circuits are not specifically relevant to this invention and so are not described in detail.

Figure 6:
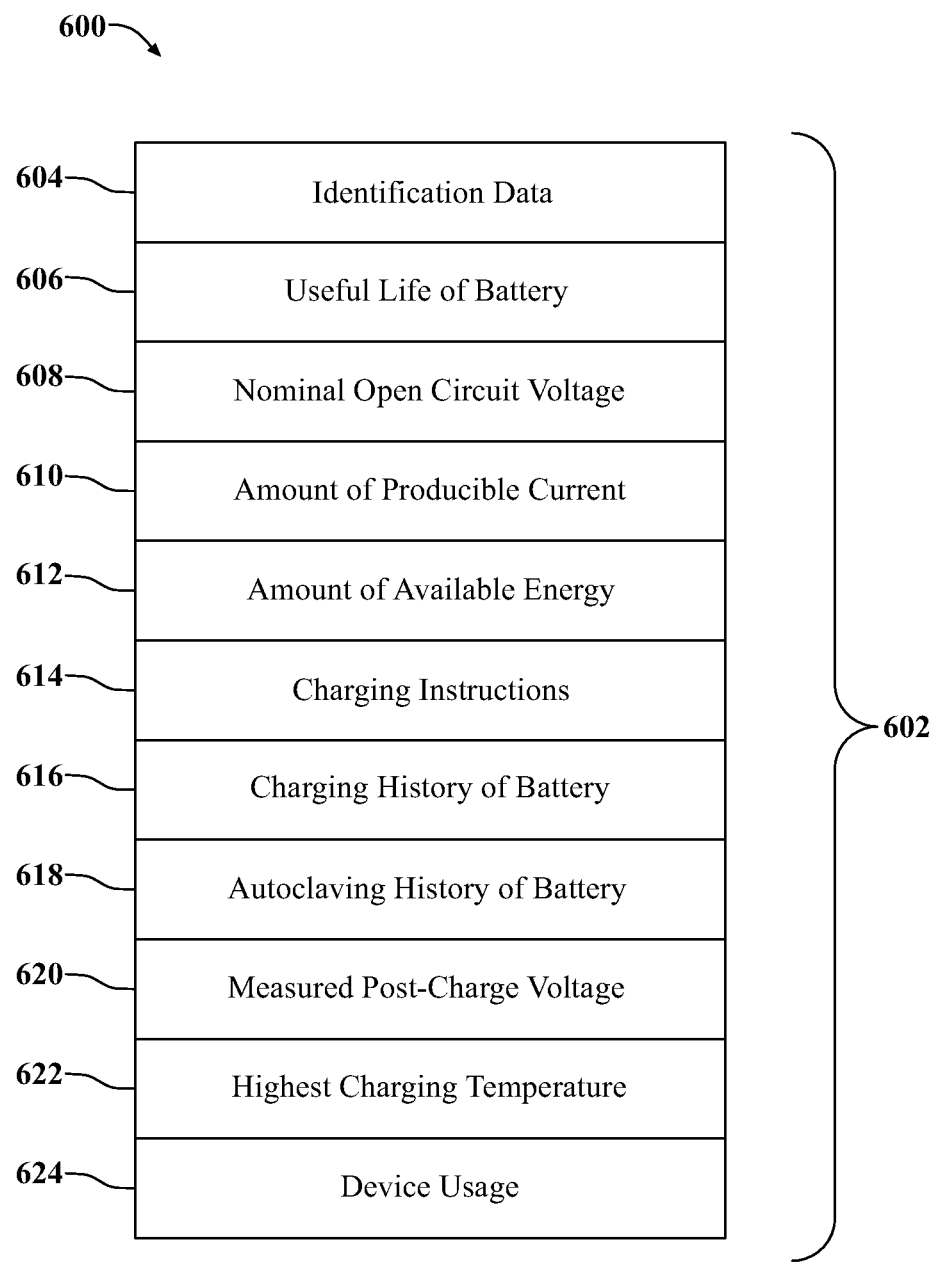
FIG. 6 is a block diagram of an exemplary data structure that may be stored in a memory of the battery controller.

FIG. 6 is a block diagram of a data structure 600 that may be stored in flash memory 504 (shown in FIG. 5), in addition to the instructions executed by the battery controller 38. The data structure 600 may store data, such as battery operational data, as one or more fields 602 in one or more records or files. As one example, identification data 604 may be stored in the file and may be used to identify the battery 30. The identification data 604, may include, for example, a serial number, a lot number, a manufacturer identification, and/or an authorization code. The authorization code or other identification information may be read by the tool 50 or charging module 402 to which the battery 30 is connected to authenticate the battery 30 (e.g., to determine if, respectively, the battery 30 can power the tool 50 or be recharged by charging module 402). The flash memory 504 may also include a field indicating the useful life 606 of the battery 30 (sometimes referred to as "useful life data"). Useful life data 606 may include one or more of the following data types: battery expiration data, a number of charging cycles that the battery 30 has undergone, and a number of autoclaving procedures or cycles the battery 30 has been subjected to. Other fields may indicate the nominal open circuit voltage 608 of the signal produced by the battery 30, the current 610 the battery 30 can produce, and the amount of available energy 612 (represented in joules, for example).

Charging instructions 614 for the battery 30 may be stored in a field 602. This data can include the types of data described in the memories of the batteries disclosed in U.S. Pat. Nos. 6,018,227 A and 6,184,655 B1, the disclosures of which are hereby incorporated by reference.

Flash memory 504 also contains data describing a charging history 616 and autoclave history 618 of the battery 30. For example, as part of the charging history 616 of the battery 30, data may be stored indicating the number of times the battery 30 was charged, as well as a timestamp indicating the time each charging cycle was initiated and/or ended.

As part of the autoclaving history 618 of battery 30, flash memory 504 may store data indicating the total number of times the battery 30 has been autoclaved, and/or a cumulative amount of time the battery 30 has been subjected to temperatures at or above a threshold considered to be the autoclave temperature. In one non-limiting embodiment, the threshold temperature is about 130 degrees centigrade. In a more specific embodiment, the threshold temperature is about 134 degrees centigrade. However, it should be recognized that the threshold temperature may be any suitable temperature. The autoclaving history 618 field 602 may also include data indicating the number of times and/or the cumulative amount of time the battery 30 has been exposed to potentially excessive autoclaving cycles. The autoclaving history 618 may also include peak autoclave temperature data indicating the highest autoclave temperature to which the battery 30 has been exposed and an amount of time the battery 30 has been in an autoclave for each of its autoclaving cycles, as well as a period of the longest single time the battery 30 was subjected to autoclaving.

A measured post-charge voltages field 620 contains data indicating the measured voltages-at-load of the battery 30 after each charging. In some embodiments, field 620 only contains these measurements for the last 1 to 10 charging cycles. In another field 622, data is stored indicating the highest battery temperature measured during its previous charging cycles. Again, field 622 may only contain data indicating the highest temperatures measured during the last 1 to 10 charging cycles of the battery.

Flash memory 504 also contains a device usage field 624. As discussed below, device usage field 624 stores data obtained from the tool 50 or other medical device that battery 30 is employed to power. For example, in one embodiment, device usage field 624 may store data indicating a number of times that the battery 30 has been connected to tool 50, a number of trigger pulls of tool 50, a total amount of time that the battery 30 has provided power to tool 50 during an operation of tool 50 (i.e., a runtime of tool 50), a number of power cycles that tool 50 has undergone, a maximum temperature tool 50 has been exposed to, a current consumption of tool 50, a speed histogram of tool 50, a list of serial numbers or other identifiers of the devices that battery 30 has interacted with, and/or any other suitable data of tool 50. It should be understood, however, that the device usage field 624 does not include patient data. The data stored in device usage field 624 may be transmitted by a communication module of medical device 50 and received by battery communication device 424.

Figure 7A:
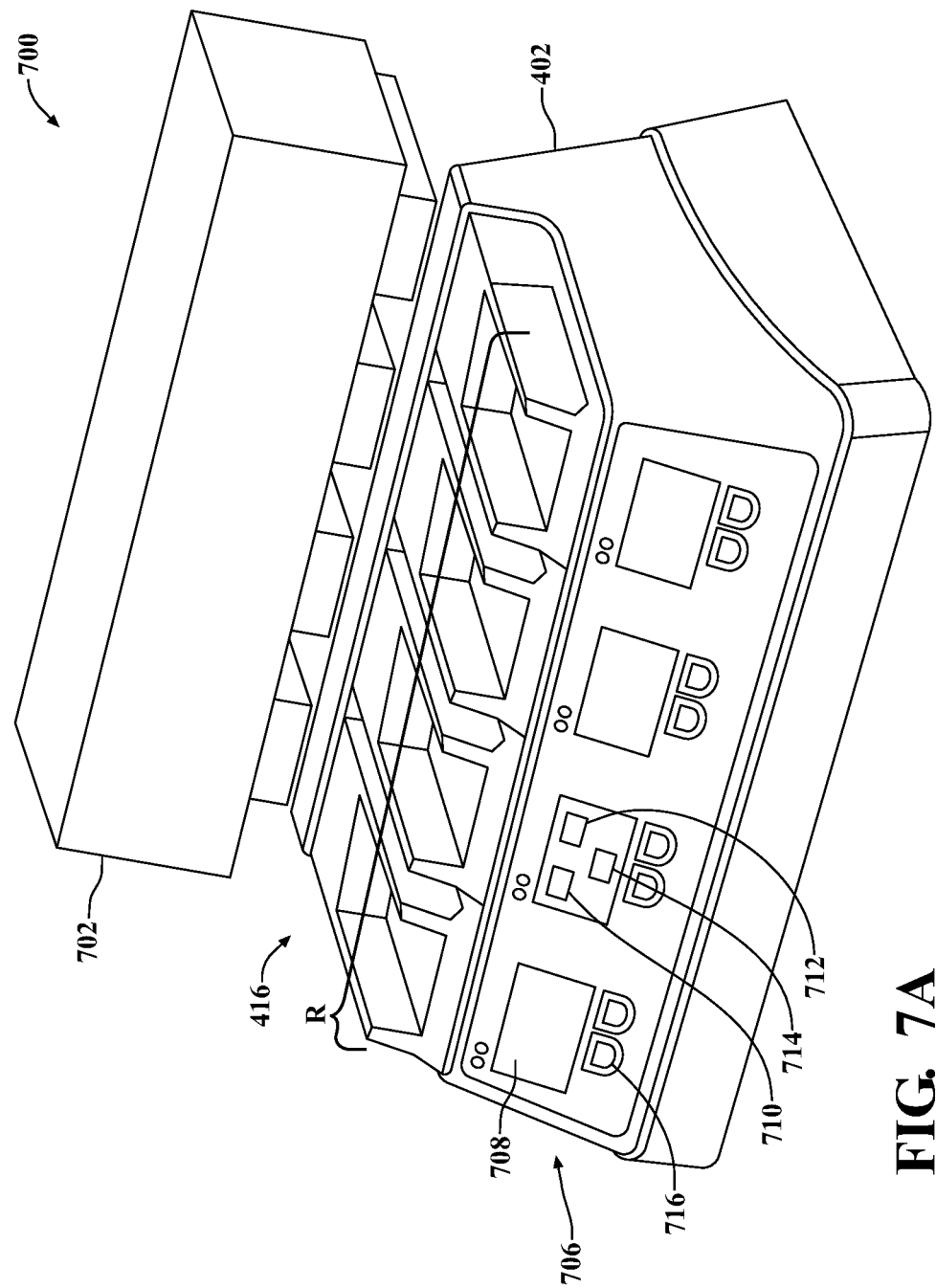
FIG. 7A is a perspective view of an embodiment of a system that includes one embodiment of the charging module and a battery container.
Figure 7B:
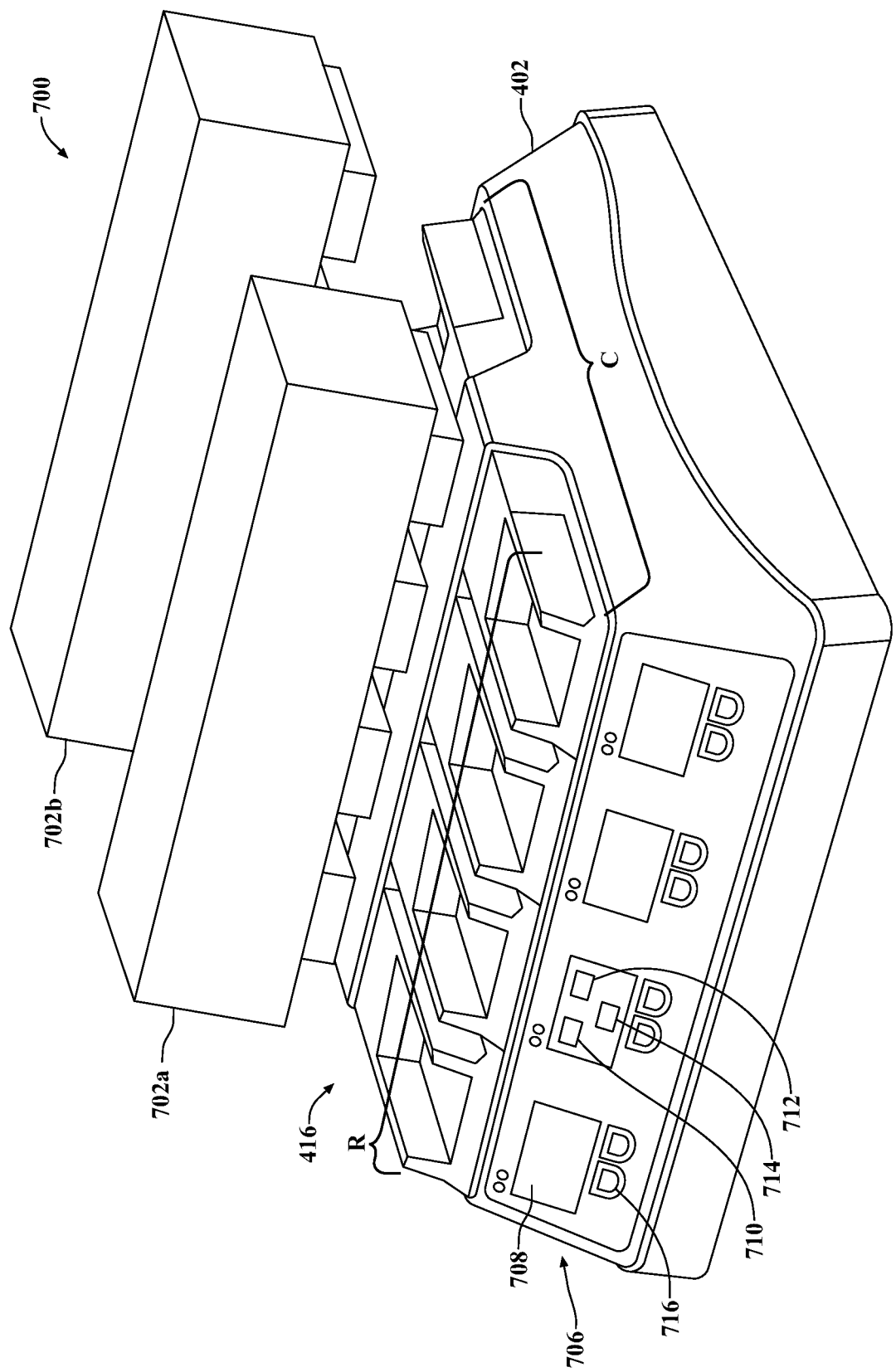
FIG. 7B is a perspective view of an embodiment of the system that includes a second embodiment of the charging module and a plurality of battery containers.
Figure 7C:
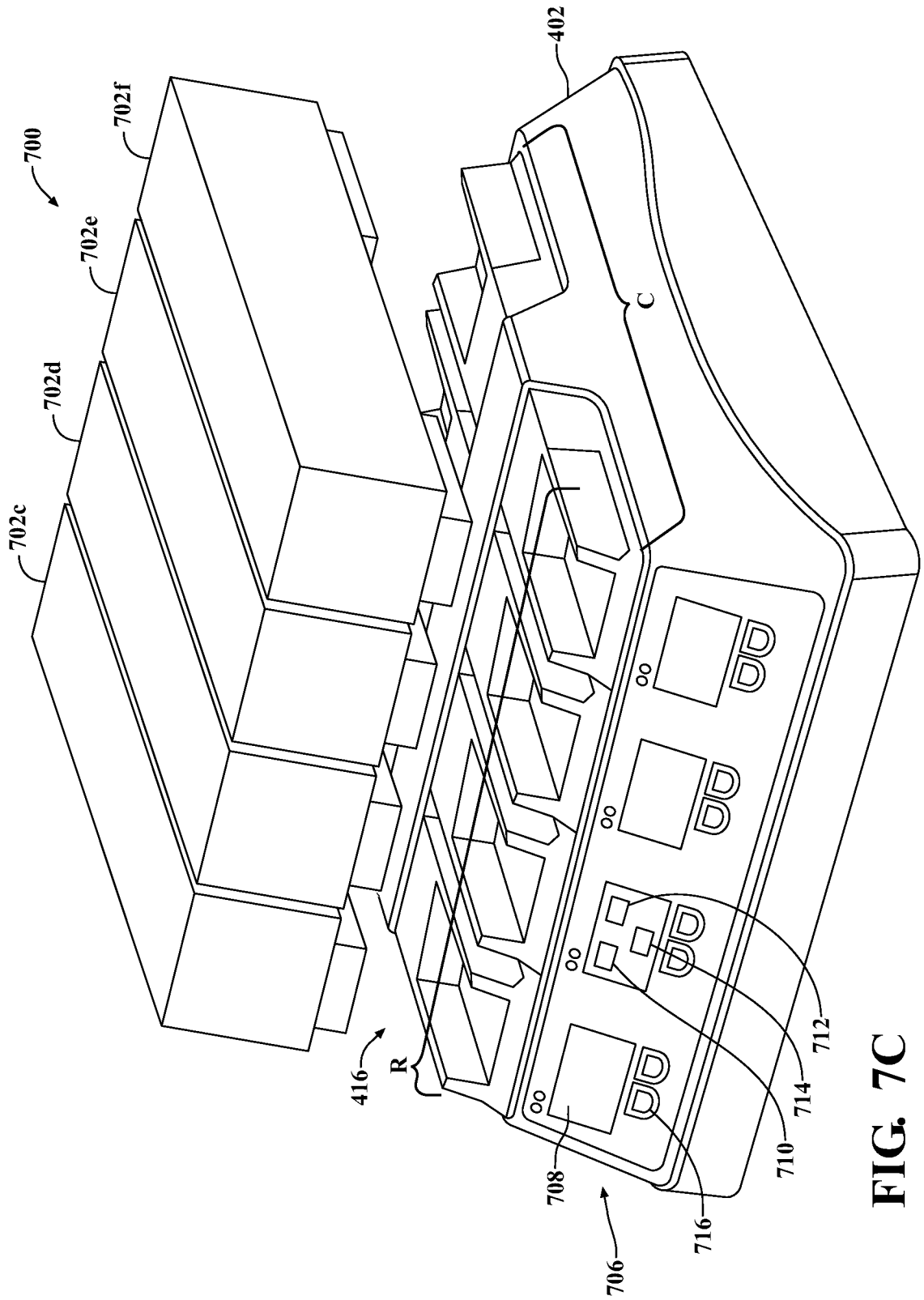
FIG. 7C is a perspective view of an embodiment of the system that includes the second embodiment of the charging module and a plurality of battery containers.
Figure 7D:
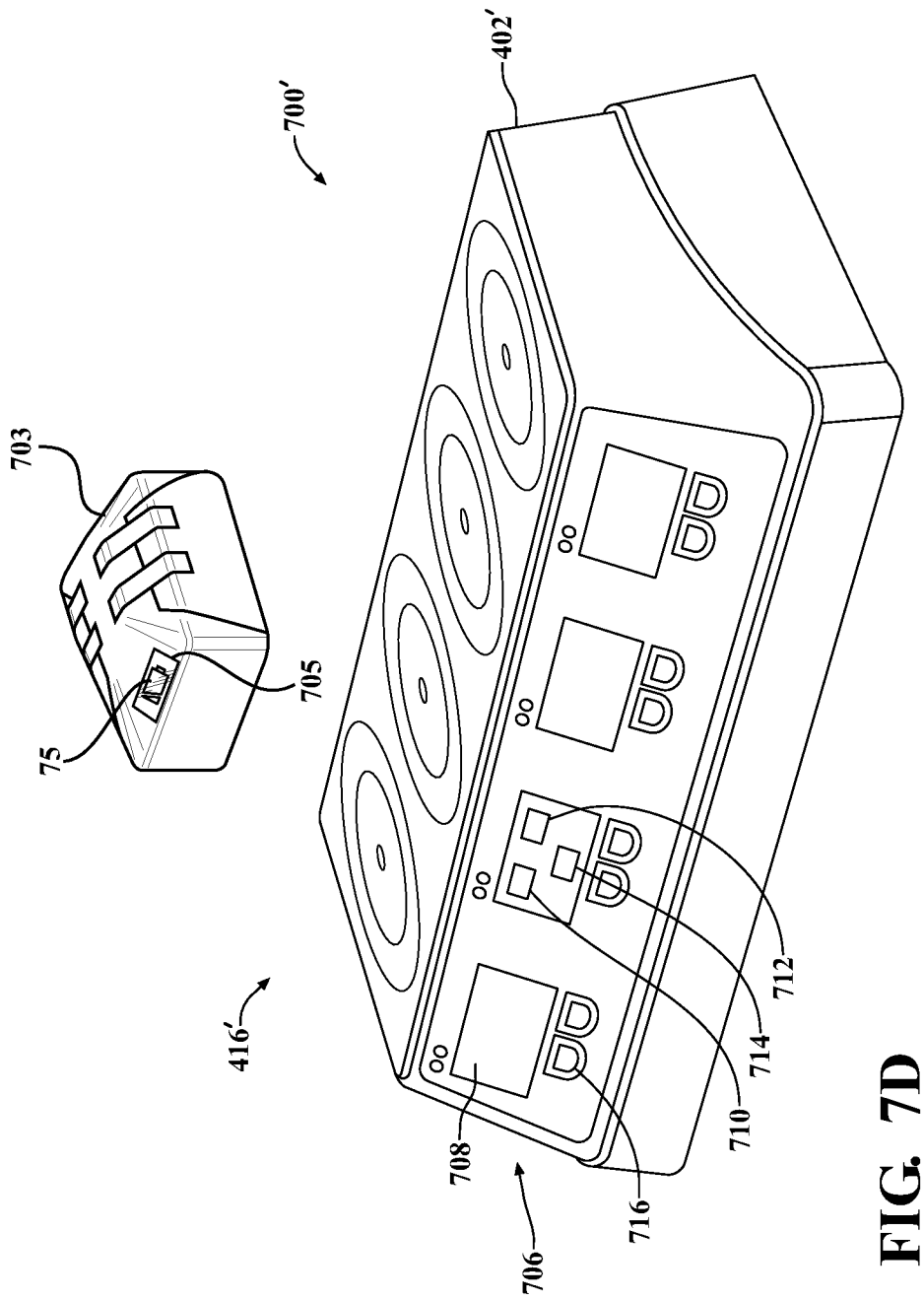
FIG. 7D is a perspective view of an embodiment of the system that includes a third embodiment of the charging module and sterilizable wraps.

FIG. 7A is a perspective view of a system 700 that includes a charging module 402 and a battery container 702. FIGS. 7B and 7C are perspective views of other embodiments of system 700 that include an instance of charging module 402, wherein charging module 402 includes additional charging bays 416 and a plurality of battery containers 702. FIG. 7D is a perspective view of system 700', an embodiment of system 700, that includes charging module 402' (shown in FIG. 4B) and sterilizable wraps 703. As described more fully herein, each battery container 702 may receive one or more batteries 30, and each charging module 402 and 402' may receive one or more battery containers 702. The battery container 702 is described in more detail below with reference to FIGS. 8 and 9.

In one embodiment, charging module 402 may include a plurality of charging bays 416. For example, in FIG. 7A, charging module 402 includes four charging bays 416 and in FIGS. 7B and 7C, charging module 402 includes eight charging bays 416. It could alternatively have six distinct bays. Furthermore, the charging bays 416 may be arranged in any suitable fashion. For example, in FIG. 7A, the four charging bays 416 are arranged in a single row R. In FIGS. 7B and 7C, the eight charging bays 416 are arranged in two rows R, such that each row R includes four charging bays 416 or three bays. In FIGS. 7B and 7C, the eight bays 416 may also be described as being arranged into four columns C, such that each column C includes two charging bays 416. Alternatively, charging module 402 may only include a single charging bay 416 for receiving a battery 30 and/or a portion of a battery container 702. As described above with reference to FIG. 4A, each charging bay 416 includes a power antenna 406 and a communication antenna 412 that are coupled to the charger controller 408. Each charging bay 416 is shaped and sized to receive at least a portion of a battery container 702.

In various embodiments, the charging module 402 may be shaped in any suitable manner for charging batteries 30. For example, referring to FIG. 7D, the charging bays 416' of charging module 402' are illustrated as substantially flat surfaces, such as a substantially flat Wireless Power Consortium (Qi) charger, on which batteries 30 wrapped in sterilizable wraps 703 may be placed. In some embodiments, the charging bays 416 and 416' may include a frictional surface to prevent batteries 30 from sliding.

System 700 may include one battery container 702 or a plurality of battery containers 702. Referring to FIG. 7A, system 700 includes one battery container 702, which may be placed onto the single row R of charging bays 416 of the charging module 402, as shown. In FIG. 7B, system 700 includes two battery containers 702a and 702b, which may be placed onto the two rows R of charging bays 416 of charging module 402, as shown. In FIG. 7C, system 700 includes four battery containers 702c, 702d, 702e, and 702f, which may be placed onto the four columns C of the charging bays 416, as shown. Some embodiments of system 700, such as system 700' of FIG. 7D, may include a sterilizable wrap 703. In such embodiments, the battery 30 may be placed inside sterilizable wrap 703. The battery 30 wrapped with sterilizable wrap 703 may then be charged when placed onto a charging bay 416 or onto a charging bay 416', as shown in FIG. 7D.

When battery container 702 is positioned proximate to charging module 402 such that each battery 30 within an associated receptacle of battery container 702 is positioned proximate to a charging bay 416, battery 30 may communicate with charger controller 408 through battery container 702 via communication antenna 412 of charging bay 416 and may receive charging power via power antenna 406 of charging bay 416. In a specific embodiment, each battery container 702 may be placed onto charging module 402 such that a protrusion aligned with each receptacle of battery container 702 is placed on a respective charging bay 416 of charging module 402.

Furthermore, the number of receptacles and the number of corresponding protrusions in a first container, such as container 702a or 702b in FIG. 7B, is greater than the number of receptacles and the number of corresponding protrusions in a second container, such as container 702c, 702d, 702e, or 702f in FIG. 7C. Referring back to the charging modules 402 shown in FIGS. 7B and 7C, the number of columns C of charging bays 416 of charging module 402 corresponds to the number of receptacles and protrusions in the first container and the number of rows R corresponds to the number of receptacles and protrusions in the second container. Specifically, the first container, illustrated as container 702a or 702b in FIG. 7B, includes four receptacles and corresponding protrusions. The second container, illustrated as container 702c, 702d, 702e, or 702f in FIG. 7C, includes two receptacles and corresponding protrusions. Accordingly, charging module 402 includes four columns C and two rows R of charging bays 416. In other embodiments, the number of columns C and rows R of the charging module 402 and the number of receptacles and protrusions in the first and second containers may vary. For example, while the number of columns C is greater than rows R in the embodiment of FIGS. 7B and 7C, in other embodiments, the number of columns C may be equal to or less than the number of rows R.

Charging module 402 may include a display area 706 that includes a plurality of indicators that provide information relating to the status of the batteries 30 being charged by the charging module 402. In one embodiment, a charging display 708 is associated with each charging bay 416 of the charging module 402. Each charging display 708 includes an indicator 710 representing a state of charge of the battery 30 (hereinafter a state of charge indicator 710) being charged by the charging bay 416, and an indicator 712 representing a state of health of the battery 30 being charged by the charging bay 416 (hereinafter a state of health indicator 712). In one embodiment, the state of health of each battery 30 may be determined in a manner similar to that described in U.S. Provisional Patent Application Ser. No. 62/523,494, entitled "SYSTEM AND METHOD FOR DETERMINING AN AMOUNT OF DEGRADATION OF A MEDICAL DEVICE BATTERY", the disclosure of which is incorporated herein in its entirety. Each indicator may be implemented using one or more indicator devices 414 described above with reference to FIGS. 4A and 4B. Accordingly, each indicator may include an LED or other light source that illuminates all or a portion of the indicator to display the state of health and/or the state of charge to a user. Alternatively, each indicator may include any other suitable device or display that enables a user to view the data representing the state of health and/or the state of charge of each battery 30. Additionally or alternatively, one or more of the indicators may be provided on or within each battery 30.

As described more fully herein, data representative of the state of health and the state of charge of each battery 30 may be transmitted by battery 30 to charging module 402 through communication antenna 412 of charging bay 416 that battery 30 is placed within or proximate to. The data is transmitted from communication antenna 412 to charger controller 408. Charger controller 408 controls display area 706 to cause state of charge indicator 710 and state of health indicator 712 to reflect the state of charge data and the state of health data received from battery 30.

In some embodiments, display area 706 also includes a temperature indicator 714 that displays data representative of an ambient temperature of an environment in which charging module 402 is positioned. Charger controller 408 may receive one or more signals from a temperature sensor (not shown in FIG. 7A) indicative of the sensed ambient temperature. Charger controller 408 may control temperature indicator 714 to display the sensed temperature in the form of a digital display or any other suitable display.

In another embodiment, display area 706 may include a refresh icon 716 that a user may select or press. Charger controller 408 may receive a signal in response to the user selecting or pressing refresh icon 716, and charger controller 408 may initiate a refresh of display area 706 in response. The refresh of display area 706 may include a re-determination and re-display of the state of charge of each battery 30, the state of health of each battery 30, and the ambient temperature of the environment in which charging module 402 is placed.

Figure 9:
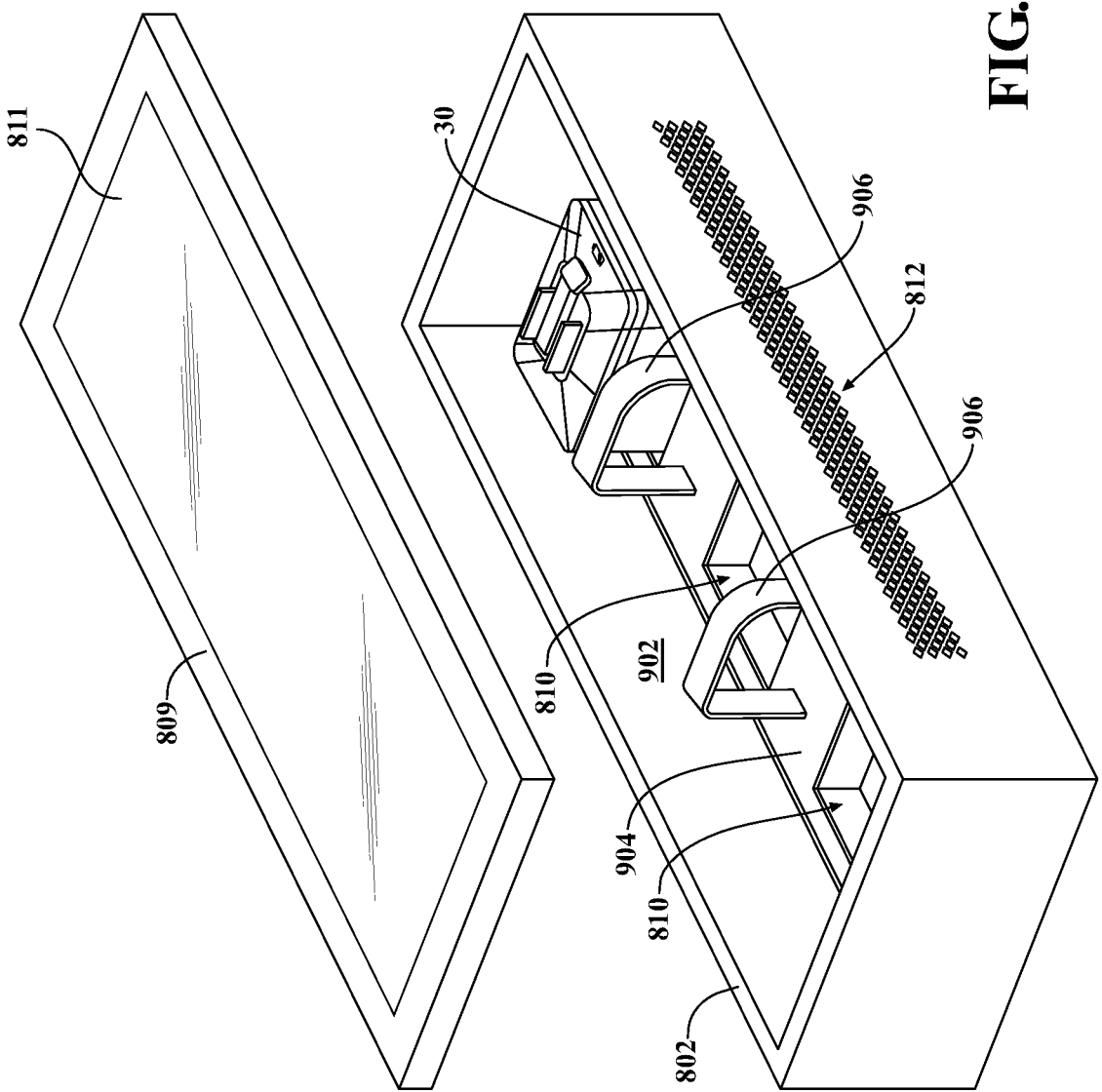
FIG. 9 is a perspective view of an interior of a battery container.

In one embodiment, charging module 402 and/or battery container 702 may include one or more sensors that measure a sterility of each battery 30 and/or sterile volume 902 (shown in FIG. 9). The sensors may transmit signals representative of the measured sterility to charger controller 408, and charger controller 408 may cause an associated indicator within display area 706 to display the measured sterility.

Additionally or alternatively, charger controller 408 may cause an indicator within display area 706 to display a sterility state of each battery 30 and/or sterile volume 902. For example, when batteries 30 are placed within battery container 702 and battery container 702 is sterilized, a temperature sensor within battery container 702 may detect the exposure of battery container 702 to a temperature indicative of an autoclave process (e.g., a temperature of more than 130 degrees Centigrade) or other sterilization process and may cause a pin or portion of data stored in a memory (not shown) to reflect that the sterile volume 902 and batteries 30 disposed therein are in a sterile state. Another sensor may detect when battery container 702 is opened (e.g., when the top portion is removed) and may cause the pin or portion of data stored in memory to reflect that sterile volume 902 and batteries 30 disposed therein may no longer be in a sterile state. Charger controller 408 may receive a signal representative of the sterile state of battery container 702 and may cause the indicator within display area 706 to reflect the sterile state.

Figure 8:
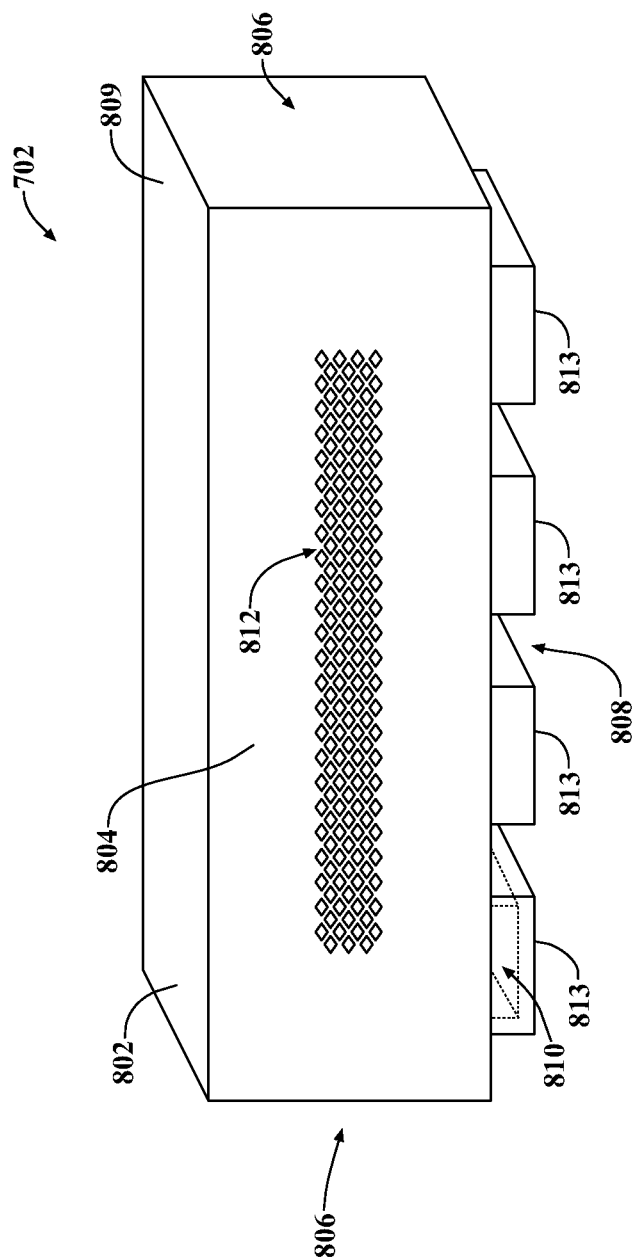
FIG. 8 is a perspective view of a battery container.

FIG. 8 is a perspective view of a bottom portion of a battery container 702. FIG. 9 is a perspective view of an interior of battery container 702. In the embodiments shown in FIGS. 8 and 9, battery container 702 is substantially rectangular in shape. However, it should be recognized that the battery container 702 may be any suitable shape that enables the container to operate as described herein.

In one embodiment, battery container 702 optionally includes a housing 802 having two opposing side portions 804, two opposing end portions 806, a bottom portion 808, and a top portion 809. In one embodiment, housing 802 is sealable to provide and maintain a sterile volume 902 (shown in FIG. 9) within an interior of battery container 702. In one embodiment, the top portion 809 (or another suitable portion) of housing 802 is removable to enable one or more batteries 30 to be removably placed inside one or more corresponding receptacles 810 (shown in phantom in FIG. 8) provided in battery container 702. In such embodiments, the battery container 702 includes protrusions 813, which are aligned with a corresponding receptacle 810. The protrusion defined by the outer surface of the battery container and is typically vertically aligned with the receptacle, which by virtue of inserting the battery within the receptacle, becomes aligned with the battery. Thus, by positioning the protrusions of the battery container within the charging bays of the charger, the one or more antennas of the battery are functionally aligned with the one or more antennas of the charger.

In addition, in some embodiments, at least a portion of housing 802 is at least partially transparent, translucent, and/or non-opaque to enable a user to view the presence of batteries 30 within receptacles 810 and/or a status of batteries 30. For example, as shown in FIG. 1, the batteries 30 may include a battery status indicator 75, such as an LED, that indicates a state of charge and/or a state of health of battery 30. In such embodiments, the housing 802 may include a transparent portion 811, such that the battery status indicator 75 may be viewable through the transparent portion 811 when battery 30 is placed within a receptacle 810. In another such embodiment, the housing 802 may be at least partially transparent, such that the battery status indicator 75 may be viewable through the housing 802 when battery 30 is placed within a receptacle 810.

In one embodiment, each side portion 804 includes a plurality of vents 812 that enables sterilizing gas to enter the interior of housing 802. A filter (not shown) may be coupled to a surface of vents 812 facing the interior of housing 802 to prevent or minimize an amount of contaminants that might otherwise enter the interior of housing 802. For example, the filter may cooperate with the housing 802 to maintain sterility of the sterile volume 902 after the entire battery container 702 has been sterilized. Thus, sterile volume 902 may be maintained in a sterile state even when battery container 702 is moved to a non-sterile location, so long as the housing 802 was not opened.

Referring to FIG. 9, and as described above, each receptacle 810 sized and shaped to removably receive a battery 30. While FIG. 9 illustrates battery container 702 having three receptacles 810 (and three protrusions 813 that are not shown), it should be recognized that any suitable number of receptacles 810 and corresponding protrusions 813 may be provided in battery container 702 to enable battery container 702 to be used with charging module 402. For example, in one embodiment, each battery container 702 may only include a single receptacle 810 and protrusion 813 for receiving a single battery 30. Each protrusion 813 is sized and shaped such that each protrusion 813 may be placed onto a corresponding charging bay 416 of charging module 402. In addition, each receptacle 810 and protrusion 813 is shaped to align with a corresponding charging bay 416 to enable a battery 30 placed in receptacle 810 to be maintained in alignment with power antenna 406 and communication antenna 412 of charging bay 416.

In one embodiment, a removable tray 904 may be provided within battery container 702. In such an embodiment, batteries 30 may be placed within tray 904, and tray 904 may be placed into battery container 702 or removed from battery container 702. Tray 904 may include one or more handles 906 that enable tray 904 to be easily grasped and lifted into and out of battery container 702.

During operation, batteries 30 may be sterilized and moved to a desired location of use (e.g., an operating room) primarily in two ways according to the embodiments described herein. First, batteries 30 may be sterilized in an autoclaving process (or another suitable process) and may be placed into battery container 702. Battery container 702 may alternatively be sterilized to ensure that sterile volume 902 is suitably sterile. Batteries 30 are thus placed into corresponding receptacles 810 within sterile volume 902 of battery container 702 such that the sterile state of batteries 30 is maintained. The top portion 809 (or other removable portion) of battery container 702 is placed onto container 702 such that container 702 is microbially sealed. Battery container 702 may then be carried or otherwise transported to the desired location of use while maintaining the sterile state of batteries 30 and sterile volume 902.

Alternatively, batteries 30 may be placed within sterilizable wraps 703 (sometimes referred to as "blue wraps"), as shown in FIG. 7D. The sterilizable wraps 703 may be sterilized together with batteries 30 such that the sterility of the battery 30 is maintained until after the sterilizable wrap 703 is removed. The sterilized batteries 30 may be kept within sterilizable wraps 703 and placed onto respective charging bays 416 of charging module 402 after the sterilization process. Batteries 30 may then be removed from sterilizable wraps 703 when batteries 30 are ready to be used in the operating room or other location of use. In embodiments where the battery 30 includes the battery status indicator 75, the sterilizable wraps 703 may include a transparent portion 705, as shown in FIG. 7D, such that the battery status indicator 75 may be viewable through the transparent portion 705 when battery 30 is placed within sterilizable wraps 703. In other embodiments, sterilizable wraps 703 may be at least partially transparent, such that the battery status indicator 75 may be viewable through sterilizable wraps 703 when battery 30 is placed within sterilizable wraps 703.

In the second way, batteries 30 may be placed within corresponding receptacles 810 of battery container 702 prior to sterilization. Battery container 702 may then be sterilized in an autoclave process (or other suitable sterilization process) while batteries 30 remain inside container 702. Thus, in this embodiment, batteries 30 and battery container 702 may be sterilized together and sterile volume 902 may be formed or maintained in a sterile state. Battery container 702 may then be carried or otherwise transported to the desired location of use while maintaining the sterile state of batteries 30 and sterile volume 902.

Accordingly, as described herein, batteries 30 may be disposed within the microbially sealed sterile volume 902 and may be placed in proximity to charging module 402. Charging module 402 may provide charging power to batteries 30 while batteries 30 remain microbially sealed within sterile volume 902. In addition, charging module 402 may communicate with batteries 30 while batteries 30 are sealed within sterile volume 902 to obtain battery operational data, battery state data, and/or any other suitable data described herein. In yet another alternative, the batteries 30 may be placed in the container 702 before sterilization, the container 702 could be placed adjacent to the charging module 402 while the container 702 and the battery 30 are in the non-sterile state, and after charging, the container 702 and battery 30 may be sterilized such that the charged battery 30 is stored in the sterile and charged state until the container 702 is opened.

Figure 10:
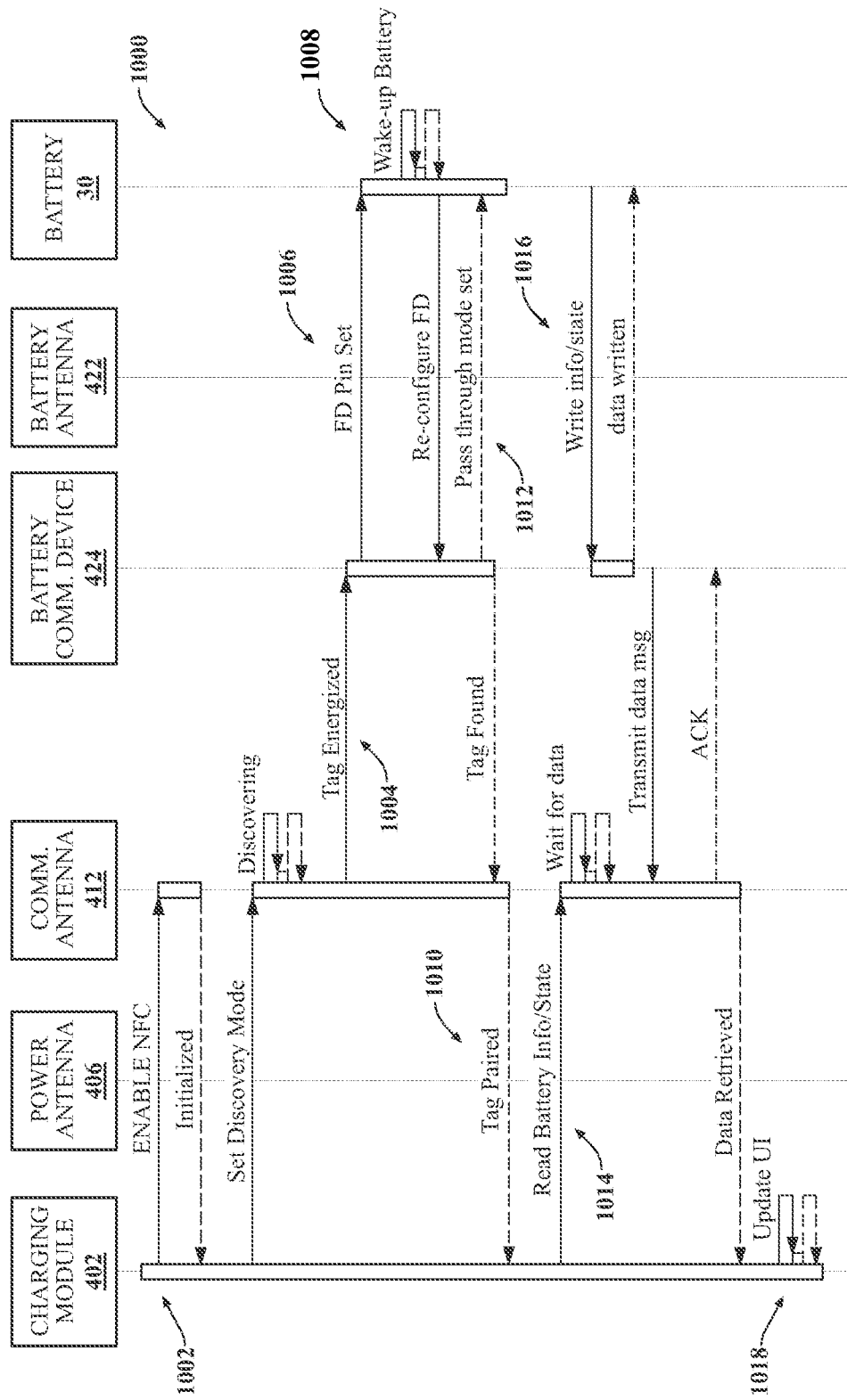
FIGS. 10-12 are flowcharts of an exemplary method of providing charge to a battery.
Figure 11:
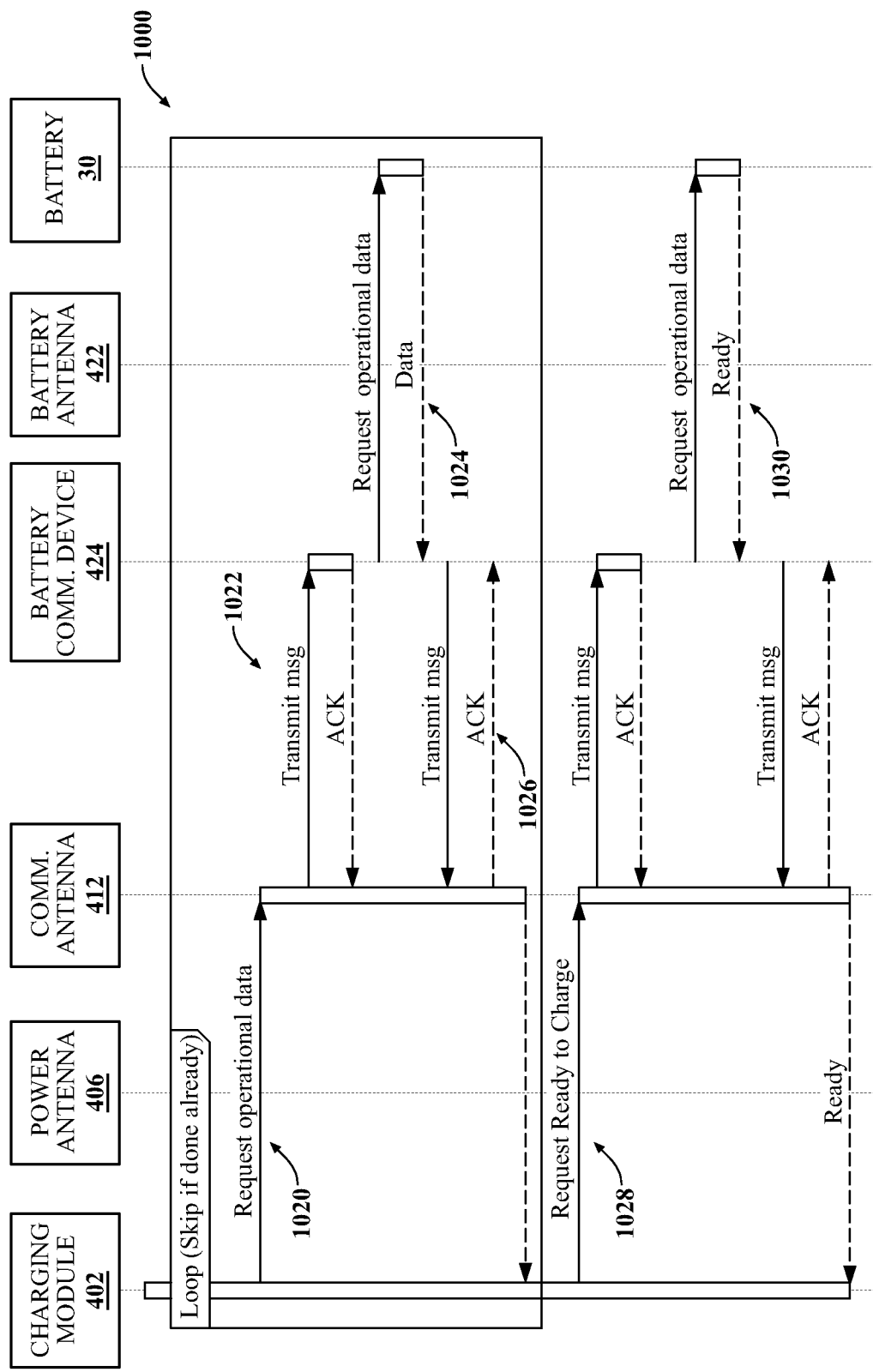
Figure 12:
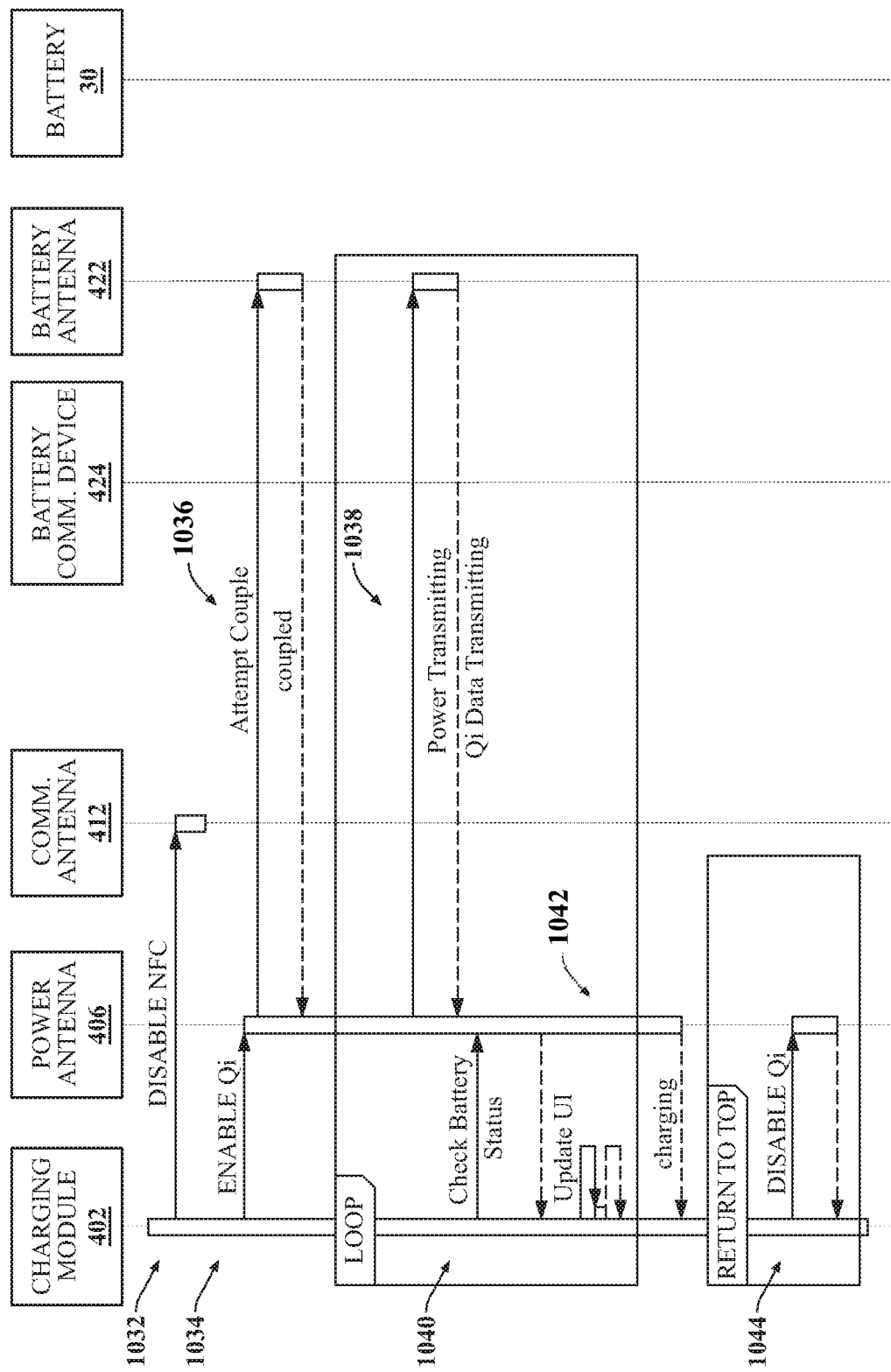

FIGS. 10-12 are flowcharts of an exemplary method 1000 of providing charge to (or "charging") a battery that may be used with battery 30 and charging module 402 described herein. In an embodiment, method 1000 is performed by executing computer-readable instructions stored within one or more memory devices of charging module 402 and/or battery 30. For example, charger controller 408 and/or battery controller 38 may execute instructions stored within memory 410 and/or flash memory 504 to perform the functions of method 1000 described herein.

Referring to FIG. 10, in one embodiment, charging module 402 enables or activates 1002 communication antenna 412 to detect one or more batteries 30 positioned in proximity to charging module 402. In a specific embodiment, communication antenna 412 is activated while power antenna 406 is deactivated. Once communication antenna 412 is activated, charging module 402 enters a discovery mode. During the discovery mode, charging module 402 detects a proximity of a battery 30 when battery 30 is placed proximate to a charging bay 416. For example, when a battery container 702 including a battery 30 is placed onto charging module 402 such that the battery 30 is positioned within, or proximate to, a charging bay 416, the wireless communication field generated by communication antenna 412 energizes 1004 a tag 430 within battery communication device 424. Battery 30 may initially be in a low power state in which one or more components of battery 30 (e.g., battery controller 38) are at least partially deactivated. Additionally or alternatively, battery controller 38 may detect when battery 30 is placed in proximity to charging module 402 based on the presence of the electromagnetic field, for example.

In response to tag 430 being energized, a field detection pin or device within tag 430 may be set 1006. In another embodiment, the field detection pin may be enabled when battery 30 is paired to the charging bay 416 that battery 30 is positioned proximate to as described more fully herein. The setting of the field detection pin 1006 causes battery 30 to exit 1008 the low power state (or "wake up") and enter an operational or full power state in which the components of battery 30 are activated. In one embodiment, battery 30 draws power from battery cells 32 during the low power state and the full power state until charging power is provided by charging module 402 (e.g., until an electromagnetic field is established by power antenna 406 to provide charging power to battery 30).

As used herein, the low power state may refer to a power state in which at least some portions of battery 30 are disabled and battery 30 consumes less power than in a full power state in which all portions of the battery are enabled. In one embodiment, battery controller 38 may draw a current of about 20 milliamps (ma) or lower while battery 30 is in the low power state. Alternatively, the low power state may be characterized as a power state in which at least some components of battery 30 are disabled, and portions of battery controller 38 are disabled such that battery controller 38 draws a current that is less than 5% of the current that battery controller 38 draws when battery 30 is in the full power state.

In one embodiment, when tag 430 is energized by the electromagnetic field generated by communication antenna 412, an antenna within tag 430 or battery communication device 424 transmits a pairing message to communication antenna 412 to cause battery communication device 424 to be paired 1010 with communication antenna 412 (and therefore to pair battery 30 with charging bay 416 and charging module 402). In a specific embodiment, tag 430 is an NFC tag that enables battery communication device 424 to pair with communication antenna 412 using an NFC protocol in response to the energizing of tag 430 by communication antenna 412. Alternatively, battery 30 may be paired with charging module 402 and/or charging bay 416 using Bluetooth or any other suitable protocol. During the pairing of battery 30 and charging module 402, authentication data may be received from battery 30 to enable charging module 402 to authenticate battery 30. In one embodiment, the battery authentication data may be stored within tag 430 and may be readable by charger controller 408 via communication antenna 412 to enable charging module 402 to authenticate battery 30. In such a manner, charging module 402 may ensure that only approved batteries 30 are provided with charging power from charging module 402.

In one embodiment, the battery 30 may exit 1008 the low power state in stages. In a first stage, the energizing 1004 of tag 430 may cause battery communication device 424 to exit the low power state to enable the battery communication device 424 to pair with charging bay 416. In a second stage, in response to the pairing of battery communication device 424 to charging bay 416, the remaining portions of battery 30 (including battery controller 38) may exit 1008 the low power state. Alternatively, the energizing 1004 of tag 430 may cause all portions of battery 30 to exit the low power state at substantially the same time, or any other suitable sequence of exiting the low power state may be performed by battery 30.

In one embodiment, battery controller 38 may wait a predetermined amount of time (such as 150 milliseconds or another suitable time) after battery 30 has exited 1008 the low power state before moving to the next step of method 1000. After the predetermined amount of time has elapsed, battery controller 38 may reconfigure the field detection pin to place battery 30 in a "pass through" mode 1012. In the pass through mode 1012, data stored within the tag 430 is transmitted to charging module 402 via communication antenna 412, and data may also be transmitted from charging module 402 to tag 430. It should be recognized that data stored within tag 430 may be readable by charging module 402 even if battery controller 38 is inactive, in a low power state, damaged, or is otherwise unable to communicate with charging module 402 and/or tag 430.

Once the tag 430 is paired and the pass through mode is set 1012, charging module 402 begins receiving 1014 data relating to the battery state (hereinafter referred to as "battery state data") from battery 30. In one embodiment, charging module 402 transmits one or more messages to battery communication device 424 via communication antenna 412 to request the battery state data from battery controller 38. Battery controller 38 receives the messages from battery communication device 424 and provides 1016 the battery state data in response. In one embodiment, battery controller 38 temporarily stores the battery state data in tag 430 in preparation for transmission to charging module 402. Charging module 402 may then read the battery state data directly from tag 430 and may store the battery state data in memory 410 of charging module 402.

The battery state data may include a state of charge, a state of health, and/or any other suitable data of battery 30. The state of charge may include data representing an amount of capacity of battery 30 and a present charge level of battery 30 or an amount of charge needed to reach a fully charged state of battery 30.

In a specific embodiment, battery controller 38 may store the battery state data in tag 430 in predetermined blocks of data that are transmitted to charging module 402. As each block of data is transmitted to charging module 402, charger controller 408 transmits an acknowledgement message or signal to battery controller 38 via communication antenna 412 to confirm successful receipt of the block of data. In a particular embodiment, each block of data is 64 bytes. Alternatively, each block of data may include any suitable number of bytes.

After charging module 402 has received the battery state data, charging module 402 may update 1018 the display to reflect the data received. For example, charger controller 408 may transmit a command or signal to display area 706 to cause state of charge indicator 710 to reflect the present state of charge of battery 30 and to cause state of health indicator 712 to reflect the present state of health of battery 30 based on the data received.

Referring to FIG. 11, after the battery state data has been received and display area 706 has been updated, charging module 402 may request 1020 battery operational data from battery 30. In one embodiment, the battery operational data may include the data stored within the data structure 600 as described above with reference to FIG. 6. Additionally or alternatively, any other suitable data may be requested and received by charging module 402. Charger controller 408 may transmit a signal or request to communication antenna 412 to receive the battery operational data. Communication antenna 412 may transmit 1022 the signal or request to battery communication device 424 which in turn transmits a signal or request to battery controller 38. In response to receiving the signal or request, battery controller 38 may store the battery operational data in tag 430 of battery communication device 424 in preparation for transmission to charging module 402.

In a specific embodiment, battery controller 38 may store 1024 the battery operational data in tag 430 in predetermined blocks of data that are transmitted to charging module 402. In a similar manner as described above, as each block of data is transmitted 1026 to charging module 402, charger controller 408 transmits an acknowledgement message or signal to battery controller 38 via communication antenna 412 to confirm successful receipt of the block of data. In a particular embodiment, each block of data is 64 bytes. Alternatively, each block of data may include any suitable number of bytes. Charging module 402 may continually request additional blocks of battery operational data until battery controller 38 transmits a message indicating that the transmission of the battery operational data is complete. Alternatively, charging module 402 may continually request additional blocks of battery operational data until a predetermined amount of the battery operational data has been received by charging module 402. In one embodiment, the predetermined amount of battery operational data includes 3 kilobytes of data. In another embodiment, the predetermined amount of battery operational data includes a size of the data structure 600 (i.e., the amount of data able to be stored within data structure 600).

After the transmission of the battery operational data is complete, charging module 402 may transmit 1028 a message to battery controller 38 requesting that the battery controller 38 respond that it is ready to begin receiving charging power from the charging module 402. This request may be referred to as a "ready to charge request". When battery controller 38 receives the ready to charge request, battery controller 38 may determine whether one or more battery parameters are within an acceptable range. For example, battery controller 38 may determine whether a voltage output from cells 32 is within an acceptable range. If battery controller 38 determines that the battery parameters are within the acceptable range, battery controller 38 may transmit 1030 a message back to charging module 402 indicating that battery 30 is ready to receive charging power. This message may be referred to as a "ready to charge confirmation". The ready to charge confirmation message may also serve as a notification to charger controller 408 that battery 30 (and its components) has exited the low power state and is in a full power state. Battery controller 38 may also disable or deactivate battery communication device 424 in preparation for receiving charging power. For example, battery controller 38 may receive a signal or message from charger controller 408 that charging module 402 is switching to a power delivery state or is otherwise preparing to provide the charging power to battery 30. When charging module 402 receives the ready to charge confirmation, charging module 402 begins providing charging power to battery 30 as described with reference to FIG. 12. However, if battery controller 38 does not transmit the ready to charge confirmation, or instead transmits an error message due to one or more battery parameters being outside of the acceptable range, charging module 402 may prevent the delivery of power to battery 30 and method 1000 may end.

In one embodiment, the error message may be generated by battery controller 38 in response to a self-diagnosis procedure or other test executed by battery controller 38. For example, battery controller 38 may receive sensor signals representative of one or more parameters of battery 30, and may compare the sensor signals to predetermined thresholds or usage criteria to determine if battery 30 is operating correctly or is otherwise in an acceptable state of health. The error message may be transmitted by battery controller 38 via battery communication device 424 and may be received by charging module 402 via communication antenna 412. The error message may be reflected in state of health indicator 712 of charging module 402. For example, state of health indicator 712 may indicate that battery 30 has an error or is otherwise in an unacceptable state for charging and should be replaced. State of health indicator 712 may display an indication that battery 30 should be replaced by displaying text, a graphic, and/or a light having a predetermined color to indicate that replacement is suggested.

Referring to FIG. 12, charging module 402 begins the process of providing charging power to battery 30 by disabling or deactivating 1032 communication antenna 412 (e.g., by removing power to communication antenna 412) and enabling or activating 1034 power antenna 406 (e.g., by providing power to power antenna 406). Charger controller 408 then attempts to inductively couple 1036 power antenna 406 to battery antenna 422 to transmit charging power to battery 30. In one embodiment, charger controller 408 executes the Wireless Power Consortium (Qi) wireless charging protocol to inductively couple 1036 power antenna 406 to battery antenna 422 to provide the charging power to battery 30. Alternatively, charger controller 408 may execute any other suitable protocol to provide wireless charging power to battery 30 via power antenna 406 and battery antenna 422.

After the power antenna 406 and the battery antenna 422 are inductively coupled, charging power is wirelessly provided 1038 from charging module 402 to battery 30 via the respective antennas. In one embodiment, charger controller 408 operates the charging process in a loop in which charging power is provided for a predetermined amount of time. In an embodiment, the predetermined amount of time is 2 minutes. Alternatively, the predetermined amount of time is 30 seconds or any other suitable amount of time. During the charging process loop, charger controller 408 periodically transmits 1040 a request to battery 30 to receive the battery state of charge data. Battery controller 38 receives the request and transmits a response message to charger controller 408 containing the present state of charge of battery 30. Charger controller 408 may then update 1042 display area 706, such as by updating state of charge indicator 710, to reflect the present state of charge of battery 30. If charger controller 408 determines that battery 30 has not yet reached a full state of charge, charger controller 408 may continue the charging process loop until the predetermined amount of time has elapsed. After charging power 1038 has been provided for the predetermined amount of time, charger controller 408 disables or deactivates 1044 power antenna 406 and returns to the beginning of method 1000 (i.e., step 1002). In such a manner, charger controller 408 causes method 1000 to be executed in a loop until battery 30 has reached a full state of charge. Alternatively, charger controller 408 may continually provide charging power 1038 to battery 30 until battery 30 is fully charged, without periodically returning to the top of method 1000.

If, during execution of the charging loop, charger controller 408 determines that battery 30 has reached a full state of charge, charger controller 408 may update display area 706 to reflect the completed charging of battery 30 (e.g., by causing state of charge indicator 710 to be illuminated with a particular color such as green or blue). Charger controller 408 then stops providing charging power to battery 30 and disables or deactivates 1044 power antenna 406. Battery 30 may then be removed from charging bay 416 and/or battery container 702 and may be used as desired.

During the charging process, battery 30 may visually indicate the state of charge and/or state of health in addition to charging module 402 displaying the state of charge and state of health on the charging module display area 706. For example, battery controller 38 may be coupled to one or more LEDs, such as the battery status indicator 75 (shown in FIG. 1). Battery controller 38 may cause the battery status indicator 75 to emit a first color of light (such as blue) when battery 30 is not fully charged, and may cause the battery status indicator 75 to emit a second color of light (such as green) when battery is fully charged. Battery controller 38 may cause the battery status indicator 75 to emit a third color of light (such as red) if the battery state of health indicates an error or an unacceptable level of health or degradation. In embodiments where the housing 802 is at least partially transparent, the emission of light from the battery status indicator 75 may be visible to a user when battery 30 is microbially sealed within container 702.

While method 1000 has been described herein as operating with only power antenna 406 or communication antenna 412 being activated at one time, it should be recognized that both power antenna 406 and communication antenna 412 may be activated concurrently such that power is applied to each antenna at the same time. In such an embodiment, charger controller 408 may use either antenna independently of the other such that data is only transmitted through one antenna at a time. Alternatively, charger controller 408 may operate both power antenna 406 and communication antenna 412 concurrently such that charger controller 408 transmits and/or receives data and/or power using both antennas at the same time.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for charging a battery in a sterilizable container, the system comprising:
    one or more autoclavable batteries, each battery comprising a battery controller;
    an autoclavable container comprising:
        a plurality of receptacles, each receptacle shaped to receive one of the batteries; and
        a plurality of protrusions, each protrusion being aligned with a corresponding receptacle; and
    a charging device comprising:
        a plurality of charging bays, wherein each charging bay is shaped to receive a protrusion of the container, one of the charging bays comprising:
            a first antenna configured to establish communication with a battery controller of a battery disposed within a receptacle of the container in response to the battery being within a proximity of the charging bay; and
            a second antenna configured to provide charging power to the battery disposed in the receptacle; and
        a charging controller configured to:
            detect whether the first antenna has established communication with the battery in response to the battery being within the proximity of the charging bay; and
            provide charging power to the battery via the second antenna in response to detecting that the first antenna has established communication with the battery.

2. The system of claim 1, wherein the container is configured to provide a sterile volume while the container remains microbially sealed.

3. The system of claim 1, wherein the charging device is configured to provide charging power to the battery disposed within the container while the container remains microbially sealed.

4. The system of claim 1, wherein the battery comprises a visual indicator that indicates a characteristic of the battery.

5. The system of claim 4, wherein a portion of the container is at least partially transparent to enable the visual indicator to be visible through the portion of the container when the battery is disposed within the container and the container remains microbially sealed.

6. The system of claim 1, wherein the charging device comprises a switching element that enables the charging controller to selectively activate and deactivate the second antenna, and wherein the charging controller is configured to control the switching element to deactivate the second antenna while the first antenna establishes communication with the battery controller.

7. The system of claim 1, wherein the charging device comprises a switching element that enables the charging controller to selectively activate and deactivate the first antenna, and wherein the charging controller is configured to control the switching element to deactivate the first antenna while the second antenna provides charging power to the battery.

8. The system of claim 1, wherein the battery controller is configured to:
place the battery in a low-power state until communication has been established between the battery and the first antenna; and
cause the battery to exit the low-power state in response to communication being established.

9. The system of claim 8, wherein the charging controller is configured to:
receive an indication that the battery has exited the low-power state; and
provide charging power to the battery in response to the received indication.

10. The system of claim 1, wherein the battery was previously coupled to a medical device, and wherein the battery comprises a memory device for storing data of at least one of the battery and the medical device.

11. The system of claim 10, wherein the memory device is directly readable by the first antenna of the charging device without requiring communication with the battery controller.

12. The system of claim 10, wherein the memory device is directly readable by the first antenna of the charging device while the battery is in an unpowered state.

13. The system of claim 1, wherein the first antenna is further configured to receive battery authentication data from the battery controller after establishing communication with the battery controller, and wherein the charging controller is further configured to authenticate the battery using the battery authentication data before providing charging power to the battery via the second antenna.

14. The system of claim 1, wherein:
the battery further comprises a passive communication device coupled to the battery controller;
the first antenna is further configured to energize the passive communication device of the battery in response to the battery being within a proximity of the charging bay and establish communication with the battery controller via the energized passive communication device; and the charging controller is further configured to control the first antenna to energize the passive communication device of the battery in response to the battery being within a proximity of the charging bay and establish communication with the battery controller via the energized passive communication device.

15. A method of operating a system for charging one or more autoclavable batteries, the system comprising one or more batteries, each battery comprising a battery controller, an autoclavable container comprising a plurality of receptacles shaped to receive a battery and a plurality of protrusions being aligned with a corresponding receptacle, and a charging device comprising a charging controller and one or more charging bays, each charging bay shaped to receive a protrusion, and each charging bay comprising a first antenna and a second antenna, the method comprising:
disposing a battery into a receptacle of the plurality of receptacles of the container;
placing the container onto the charging device such that a protrusion corresponding to the receptacle is adjacent to a charging bay of the one or more of charging bays and the battery is placed within a proximity of the charging bay;
communicating, by the first antenna, with the battery controller of the battery disposed within the receptacle of the container in response to the battery being within the proximity of the charging bay;
detecting, by the charging controller, that the first antenna has established communication with the battery; and
providing, by the second antenna, charging power to the battery disposed in the receptacle in response to detecting that the first antenna has established communication with the battery.

16. The method of claim 15, wherein the charging device comprises a switching element that selectively activates and deactivates the second antenna and the first antenna, the method further comprising:
deactivating, by the switching element, the second antenna while the first antenna establishes communication with the battery controller; and
deactivating, by the switching element, the first antenna while the second antenna provides charging power to the battery.

17. The method of claim 15, further comprising:
receiving, by the first antenna, battery authentication data from the battery controller after the first antenna establishes communication with the battery controller; and
authenticating, by the charging controller, the battery using the battery authentication data before providing charging power to the battery via the second antenna.

18. The method of claim 15, further comprising:
placing the battery in a low-power state until communication has been established between the battery and the first antenna; and
causing the battery to exit the low-power state in response to communication being established.

19. The method of claim 15, wherein the battery was previously coupled to a medical device and wherein the battery comprises a memory device, the method further comprising:
storing data of at least one of the battery and the medical device in the memory device
reading, by the first antenna, the data from the memory device while the battery is in an unpowered state.

20. The method of claim 15, wherein the battery further comprises a passive communication device coupled to the battery controller, the method further comprising:

controlling, by the charging controller, the first antenna to energize the passive communication device of the battery in response to the battery being within a proximity of the charging bay; and establishing, by the charging controller, communication with the battery controller via the energized passive communication device.

\* \* \* \* \*